US012737045B2

(12) United States Patent
Zhou et al.

(10) Patent No.: US 12,737,045 B2
(45) Date of Patent: Sep. 15, 2026

(54) METHOD AND APPARATUS FOR PROCESSING ELECTROENCEPHALOGRAM SIGNAL, COMPUTER-READABLE MEDIUM AND COMPUTER DEVICE

(71) Applicant: TENCENT TECHNOLOGY (SHENZHEN) COMPANY LIMITED, Shenzhen (CN)

(72) Inventors: Yanning Zhou, Shenzhen (CN); Kaiwen Xiao, Shenzhen (CN); Tian Shen, Shenzhen (CN); Jingwen Ye, Shenzhen (CN); Hu Ye, Shenzhen (CN); Ziyuan Wang, Shenzhen (CN); Sibo Liu, Shenzhen (CN); Yiqin Zhu, Shenzhen (CN); Xiao Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/092,549

(22) Filed: Mar. 27, 2025

(65) Prior Publication Data

US 2025/0224805 A1 Jul. 10, 2025

Related U.S. Application Data

(63) Continuation of application No. PCT/CN2023/128995, filed on Nov. 1, 2023.

(30) Foreign Application Priority Data

Feb. 20, 2023 (CN) ......................... 202310171555.1

(51) Int. Cl.
*G06F 3/01* (2006.01)
*G06N 3/0464* (2023.01)

(52) U.S. Cl.
CPC ........... *G06F 3/015* (2013.01); *G06N 3/0464* (2023.01)

(58) Field of Classification Search
CPC ....... A61B 5/369; A61B 5/372; A61B 5/7267; G06N 20/00; G06N 3/084; G06N 3/044;
(Continued)

(56) References Cited

U.S. PATENT DOCUMENTS

2019/0294243 A1* 9/2019 Laszlo .................... G06F 3/015
2022/0054071 A1 2/2022 Lei et al.

FOREIGN PATENT DOCUMENTS

CN 110531861 A 12/2019
CN 114504730 A 5/2022
(Continued)

OTHER PUBLICATIONS

The European Patent Office (EPO) the Extended European Search Report for Application No. 23923740.7 Oct. 20, 2025 8 Pages.
(Continued)

*Primary Examiner* — Deeprose Subedi
(74) *Attorney, Agent, or Firm* — Anova Law Group, PLLC

(57) ABSTRACT

Provided is a method for processing an electroencephalogram signal executed by a computer device. The method includes acquiring an electroencephalogram signal, the electroencephalogram signal comprising an electroencephalogram signal data segment of a specified duration; determining a plurality of time nodes in the electroencephalogram signal data segment according to a preset time interval; predicting an action intention corresponding to each time node based on the electroencephalogram signal data segment to obtain action intention prediction results respec-
(Continued)

tively corresponding to the plurality of time nodes; and determining a target action intention according to the action intention prediction results.

18 Claims, 11 Drawing Sheets

(58) Field of Classification Search
CPC .......... G06N 3/04; G06N 3/09; G06N 3/0464; G06N 3/045; G06N 7/01; G06N 3/08; G06F 3/015; G06F 18/24
See application file for complete search history.

(56) References Cited

FOREIGN PATENT DOCUMENTS

| | | |
|---|---|---|
| CN | 114626469 A | 6/2022 |
| CN | 115607169 A | 1/2023 |
| CN | 116956108 A | 10/2023 |

OTHER PUBLICATIONS

S. M. Shafiul Hasan et al. "Prediction of gait intention from pre-movement EEG signals: a feasibility study." Journal of neuroengineering and rehabilitation 17.1 (2020): 50.
Xi Fu et al., "MATN: multi-model attention network for gait prediction from EEG." 2022 International Joint Conference on Neural Networks (IJCNN). IEEE, 2022.
He He and Dongrui Wu. "Transfer learning for brain-computer interfaces: A Euclidean space data alignment approach." IEEE Transactions on Biomedical Engineering 67.2 (2019): 399-410.
He Zhao et al. "Deep representation-based domain adaptation for nonstationary EEG classification." IEEE Transactions on Neural Networks and Learning Systems 32.2 (2020): 535-545.
Vernon J. Lawhern et al. "EEGNet: a compact convolutional neural network for EEG-based brain-computer interfaces." Journal of neural engineering 15.5 (2018): 056013.
Ke Liu et al. "FBMSNet: A filter-bank multi-scale convolutional neural network for EEG-based motor imagery decoding." IEEE Transactions on Biomedical Engineering 70.2 (2022): 436-445.
The World Intellectual Property Organization (WIPO) International Search Report for PCT/CN2023/128995 Jan. 24, 2024 5 Pages (including translation).

* cited by examiner

METHOD AND APPARATUS FOR PROCESSING ELECTROENCEPHALOGRAM SIGNAL, COMPUTER-READABLE MEDIUM AND COMPUTER DEVICE

RELATED APPLICATIONS

This application is a continuation of PCT Application No. PCT/CN2023/128995 filed on Nov. 1, 2023, which claims priority to Chinese Patent Application No. 2023101715551, entitled "METHOD AND APPARATUS FOR PROCESSING ELECTROENCEPHALOGRAM SIGNAL, COMPUTER-READABLE MEDIUM, AND COMPUTER DEVICE" filed on Feb. 20, 2023, which are both incorporated herein by reference in their entirety.

FIELD OF THE TECHNOLOGY

This application belongs to the field of computer technologies, and in particular, to a method and apparatus for processing an electroencephalogram signal, a computer-readable medium, and a computer device.

BACKGROUND OF THE DISCLOSURE

Brain-computer interfaces enable a direct connection between an object's brain and external devices, which realizes direct exchange between the brain and the devices. Motor Imagery (MI) brain-computer interfaces are brain-computer interfaces focused on motor functions. The main process involves acquiring electroencephalogram signals generated by the object, and analyzing the electroencephalogram signals to control the corresponding devices to move.

The analysis of the electroencephalogram signals is often implemented by training neural network models. The trained neural network models perform feature extraction and other processes on input electroencephalogram signal segments, and output analysis results. However, the neural network models usually process the input electroencephalogram signals as a whole, and the accuracy of their analysis results needs to be improved.

The information disclosed in the background is only intended to enhance the understanding of the background of this application, and therefore may include information that does not constitute the related art known to a person skilled in the art.

SUMMARY

Embodiments of this application provide a method and apparatus for processing an electroencephalogram signal, a computer-readable medium, and a computer device.

One aspect of this application provides a method for processing an electroencephalogram signal executed by a computer device. The method includes acquiring an electroencephalogram signal, the electroencephalogram signal comprising an electroencephalogram signal data segment of a specified duration; determining a plurality of time nodes in the electroencephalogram signal data segment according to a preset time interval; predicting an action intention corresponding to each time node based on the electroencephalogram signal data segment to obtain action intention prediction results respectively corresponding to the plurality of time nodes; and determining a target action intention according to the action intention prediction results.

Another aspect of this application provides a non-transitory computer-readable medium, having computer-readable instructions stored therein, the computer-readable instructions, when executed by a processor, implementing the method for processing an electroencephalogram signal in the technical solution described above.

Another aspect of this application provides a computer device, including: a processor; and a memory configured to store computer-readable instructions of the processor, the processor being configured to execute the computer-readable instructions to cause the computer device to perform the method for processing an electroencephalogram signal in the technical solution described above.

Details of one or more embodiments of this application are provided in the accompanying drawings and descriptions below.

BRIEF DESCRIPTION OF THE DRAWINGS

To describe the technical solutions in embodiments of this application or the related arts more clearly, the following briefly describes the accompanying drawings required for describing the embodiments or the related arts. Clearly, the accompanying drawings in the following descriptions show merely some embodiments of this application, and a person skilled in the art may still derive other drawings from these accompanying drawings without contributing any inventive labor.

DESCRIPTION OF EMBODIMENTS

The technical solutions in embodiments of this application are clearly and completely described in the following with reference to the accompanying drawings in the embodiments of this application. Apparently, the embodiments described are merely some rather than all of the embodiments of this application. All other embodiments obtained by a person of ordinary skill in the art based on the embodiments of this application without creative efforts shall fall within the protection scope of this application.

In addition, the described features, structures or characteristics may be combined in one or more embodiments in any appropriate manner. In the following descriptions, a lot of specific details are provided to give a comprehensive understanding of the embodiments of this application. However, a person of ordinary skill in the art is to be aware that the technical solutions in this application may be implemented without one or more of the particular details, or another method, unit, apparatus, or step may be used. In other cases, well-known methods, apparatuses, implementations, or operations are not shown or described in detail, in order not to obscure the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely descriptions, do not need to include all content and operations/steps, and do not need to be performed in the described orders either. For example, some operations/steps may be further divided, while some operations/steps may be combined or partially combined. Therefore, an execution order may change according to a specific case.

In some embodiments of this application, relevant data such as object information (for example, electroencephalogram signals of a target object) are involved. When the embodiments of this application are applied to a specific product or technology, a permission or consent of an object is required, and collection, use, and processing of the relevant data need to comply with relevant laws, regulations, and standards of relevant countries and regions.

Figure 1:
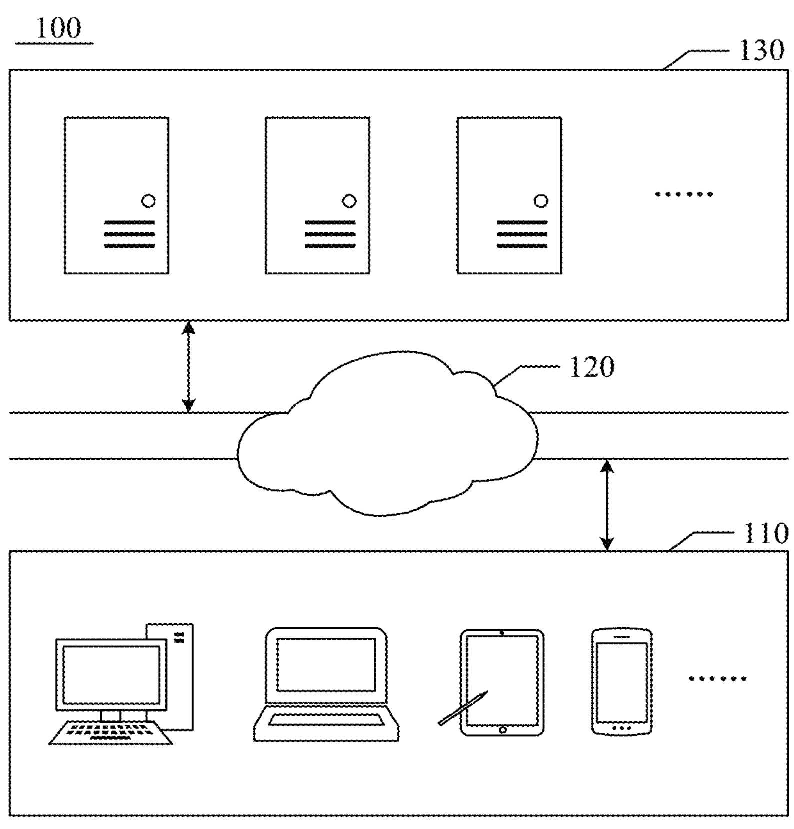
FIG. 1 schematically illustrates a block diagram of system architecture of an embodiment consistent with the disclosure of this application.

FIG. 1 schematically illustrates a block diagram of system architecture of an embodiment consistent with the disclosure of this application.

Referring to FIG. 1, system architecture 100 may include a terminal device 110, a network 120, and a server 130. The terminal device 110 may include, but not limited to, a smartphone, a tablet computer, a notebook computer, a smart speech interaction device, a smart household appliance, an on board terminal, or the like. The server 130 may be an independent physical server, or may be a server cluster including multiple physical servers or a distributed system, or may be a cloud server that provides a cloud computing service. The network 120 may be any one of various types of communication media that provide communication links between the terminal device 110 and the server 130, such as wired or wireless communication links.

According to certain use requirements, the system architecture in this embodiment may have any number of terminal devices, networks, and servers. For example, the server 130 may be a server group composed of multiple server devices. In addition, the technical solution provided in this embodiment may be applied to the terminal device 110 or the server 130, or may be jointly implemented by the terminal device 110 and the server 130, which is not specially limited in this application.

For example, the technical solution in this application is implemented by the terminal device 110. The terminal device 110 acquires an electroencephalogram signal and determines an electroencephalogram signal data segment of a specified duration based on the electroencephalogram signal. For example, the terminal device 110 may be connected to an electroencephalogram signal collection apparatus. The electroencephalogram signal collection apparatus may collect an electroencephalogram signal and transmit the electroencephalogram signal as a sample electroencephalogram signal to the terminal device 110 for processing. Then, the terminal device 110 determines multiple time nodes in the electroencephalogram signal data segment according to a preset time interval, and predicts an action intention corresponding to each time node based on the electroencephalogram signal data segment to obtain action intention prediction results respectively corresponding to the multiple time nodes. For example, the electroencephalogram signal is an electroencephalogram signal data segment of a duration of 4 s. The time axis of the electroencephalogram signal data segment is divided according to a preset time interval of 0.5, so that the electroencephalogram signal data segment has seven time nodes. Action intention prediction may be performed on the electroencephalogram signal according to the seven time nodes, so that action intention prediction results respectively corresponding to the seven time nodes in the electroencephalogram signal data segment can be obtained. Finally, the terminal device 110 determines the target action intention of a target object according to the action intention prediction result corresponding to each time node. For example, an action intention prediction result with a maximum prediction accuracy is selected from various time nodes as the target action intention, or an action intention prediction result corresponding to a time node closest to the current time is selected as the target action intention.

Figure 2:
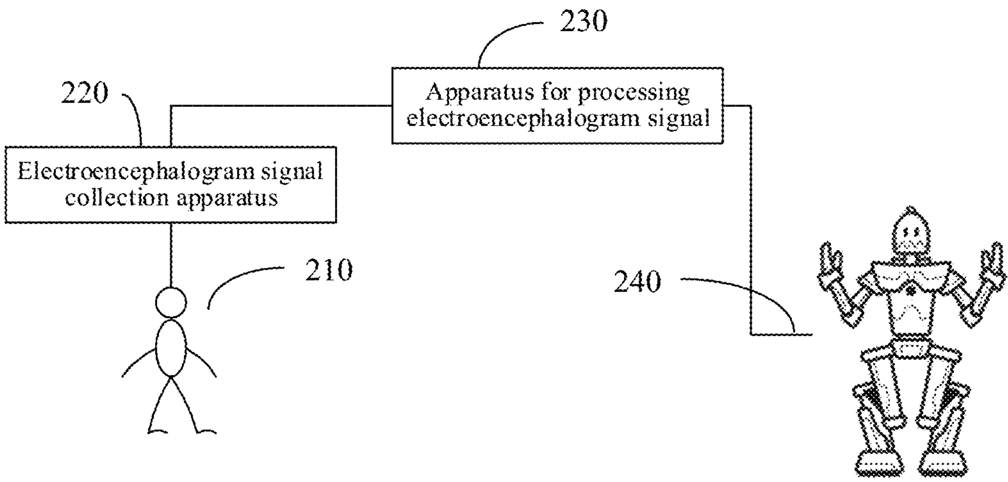
FIG. 2 schematically illustrates a schematic diagram of an application scenario of an embodiment consistent with the disclosure of this application.

For example, FIG. 2 schematically illustrates a schematic diagram of an application scenario of an embodiment consistent with this application.

Referring to FIG. 2, the embodiment consistent with the disclosure of this application includes a target object 210, an electroencephalogram signal collection apparatus 220, an electroencephalogram signal processing apparatus 230, and a target device 240. The target object 210 is a subject that generates an electroencephalogram signal, such as humans or animals. The electroencephalogram signal collection apparatus 220 is configured to collect the electroencephalogram signal generated by the target object 210. For example, the electroencephalogram signal collection apparatus 220 may be an electroencephalogram cap. The electroencephalogram signal processing apparatus 230 is configured to process the electroencephalogram signal according to the technical solution in this application to obtain the target action intention of the target object 210. The electroencephalogram signal processing apparatus 230 may be configured in a server or terminal device, such as the server 130 or the terminal device 110 shown in FIG. 1. The target device 240 is configured to perform a corresponding action according to the target action intention of the target object 210, such as lifting the arm, moving forward, or walking to the right.

In the application scenario of an embodiment consistent with the disclosure of this application, the target object 210 wears the electroencephalogram signal collection apparatus 220 in communication with the electroencephalogram signal processing apparatus 230 and performs motor imagery. For example, the target object 210 imagines walking forward or manipulating the target device 240 to walk forward. The action of "walking forward" does not actually occur, but the brain of the target object 210 will generate an electroencephalogram signal of "walking forward". The electroencephalogram signal is generated due to the activity of the brain. During motor imagery, the electroencephalogram signal is generally a continuous time series signal. The electroencephalogram signal collection apparatus 220 captures the electroencephalogram signal generated by the target object 210, and then transmits the captured electroencephalogram signal to the electroencephalogram signal processing apparatus 230. The electroencephalogram signal processing apparatus 230 may extract an electroencephalogram signal data segment of a specified duration from the electroencephalogram signal transmitted by the electroencephalogram signal collection apparatus 220 as the electroencephalogram signal, or may periodically request the electroencephalogram signal collection apparatus 220 to acquire the electroencephalogram signal containing the electroencephalogram signal data segment of the specified duration.

After acquiring the electroencephalogram signal, the electroencephalogram signal processing apparatus 230 determines multiple time nodes in the electroencephalogram signal data segment according to a preset time interval, and predicts an action intention corresponding to each time node based on the electroencephalogram signal data segment to obtain action intention prediction results respectively corresponding to the multiple time nodes. Finally, the electroencephalogram signal processing apparatus 230 determines the target action intention of the target object 210 according to the action intention prediction result corresponding to each time node. For example, it selects an action intention prediction result corresponding to a time node closest to the current time as the target action intention of the target object 210.

After determining the target action intention of the target object 210, the electroencephalogram signal processing apparatus 230 transmits the target action intention to the target device 240. The target device 240 converts the target action intention into a corresponding action control instruction and executes the corresponding target action according to the action control instruction. For example, when the electroencephalogram signal processing apparatus 230 detects that the target action intention of the target object 210 is "walking forward", the target device 240 receives the target action intention and then converts it into an action control instruction for "walking forward". After the action control instruction is executed, the target device achieves the actual action of "walking forward". According to the technical solution of the present application, the target object 210 may control the target device 240 through motor imagery. For example, an object with limited mobility may control a device to move through motor imagery to achieve rehabilitation, improve convenience in life, and the like.

Figure 3:
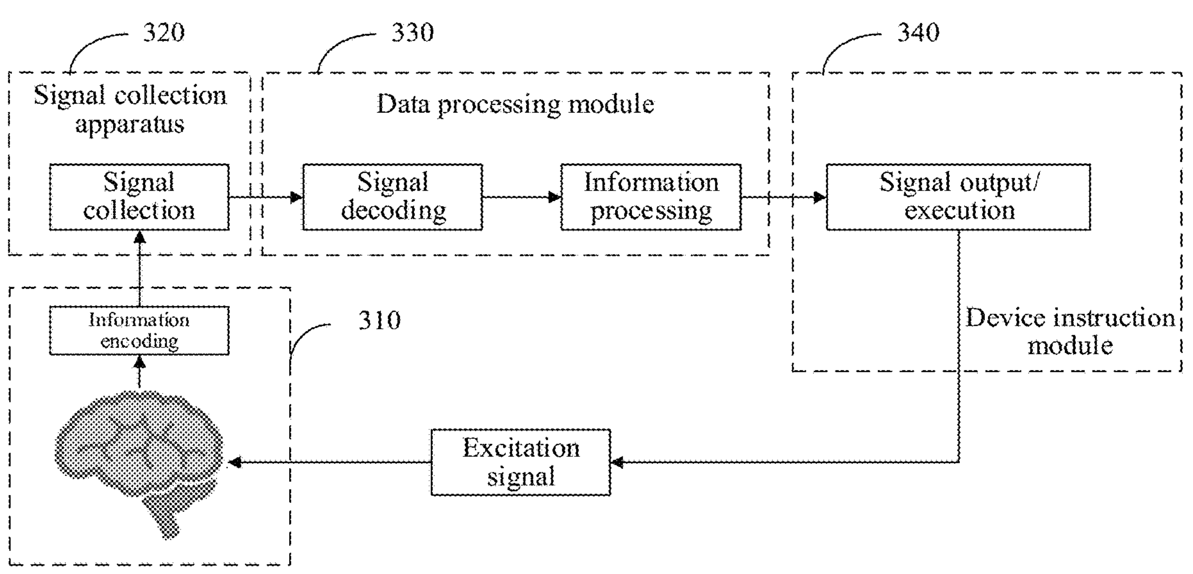
FIG. 3 schematically illustrates a block diagram of system architecture of an embodiment consistent with the disclosure of this application.

For example, FIG. 3 schematically illustrates a block diagram of system architecture to which a technical solution in this application is applied.

Referring to FIG. 3, the system architecture includes a target object 310, a signal collection apparatus 320, a data processing module 330, and a device instruction module 340. The process that the target object 310 generates an electroencephalogram signal is equivalent to the process that the brain of the target object 310 encodes an action imagined by the target object 310, known as "information encoding". The signal collection apparatus 320 performs signal collection on the target object 310, acquires an electroencephalogram signal generated by the target object 310, and transmits the electroencephalogram signal to the data processing module 330. The data processing module 330 performs signal decoding and information processing. Signal decoding refers to analyzing the electroencephalogram signal transmitted by the signal collection apparatus 320 to recognize the target action intention of the target object 310. The data processing module 330 may achieve signal decoding through the technical solution in this application. Information processing refers to converting the recognized target action intention into a signal that can be recognized by the device, which, for example, may be communication protocol conversion, signal format conversion, and the like. The device instruction module 340 is configured to execute the target action indicated by the target action intention, for example, through a robot, a mechanical device, and the like. The device instruction module 340 converts the target action intention into a device-executable control instruction and executes it, so as to execute the corresponding target action. After the device instruction module 340 executes the corresponding target action, an action execution result is to enable the target object 310 to generate an excitation signal for a next electroencephalogram signal segment (such as next motor imagery), which is equal to a feedback signal. For example, after the device instruction module 340 executes the action of "walking forward", the target object 310 continuously performs motor imagery to the next action of the device instruction module 340 according to the action execution result. For example, continuous motor imagery may be imagery to control the device to "walk to the right", "walk to the left", or continuously "walk forward".

A method for processing an electroencephalogram signal according to this application will be described below in detail with reference to the specific implementation.

Figure 4:
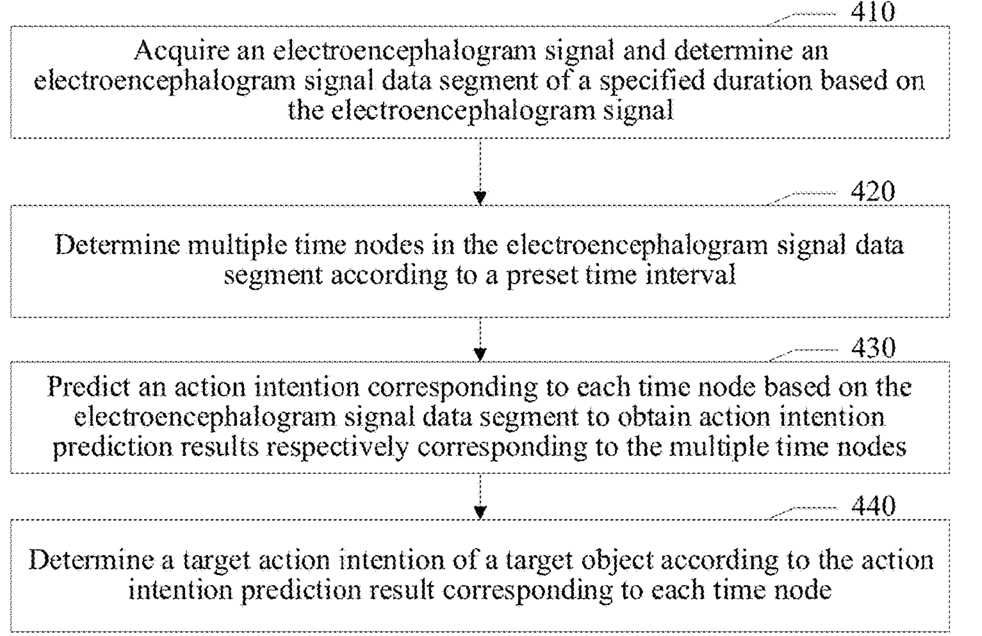
FIG. 4 schematically illustrates a flowchart of a method for processing an electroencephalogram signal according to an embodiment of this application.

FIG. 4 schematically illustrates a flowchart of a method for processing an electroencephalogram signal according to an embodiment of this application. The method for processing an electroencephalogram signal according to this embodiment of this application may be implemented by an apparatus for processing an electroencephalogram signal. The specific implementation process of the method will be described below with the apparatus for processing the electroencephalogram signal as the subject that executes the method. Referring to FIG. 4, the method for processing an electroencephalogram signal according to this embodiment of this application specifically includes operation 410 to operation 440 as follows:

Operation 410: Acquire an electroencephalogram signal and determine an electroencephalogram signal data segment of a specified duration based on the electroencephalogram signal.

Specifically, the target object is a subject that generates an electroencephalogram signal, such as humans, bionic robots, or animals. The electroencephalogram signal may be an electroencephalogram signal generated by the brain of the target object during an activity, such as an electroencephalogram signal generated during motor imagery. Motor imagery refers to the idea that the target object imagines a motion or action through the brain, but the target object does not actually execute that motion or action. The electroencephalogram signal is an electrical signal generated by the activity of the brain and is a continuous time series signal. When the target object generates an electroencephalogram signal, the electroencephalogram signal processing apparatus acquires an electroencephalogram signal data segment of a specified duration as the electroencephalogram signal, that is, the electroencephalogram signal is a data segment of a certain duration, rather than an electroencephalogram signal generated at a certain time.

In some embodiments, the electroencephalogram signal is collected by the signal collection apparatus and transmitted to the electroencephalogram signal processing apparatus. The electroencephalogram signal processing apparatus may extract an electroencephalogram signal data segment of a specified duration from the electroencephalogram signal transmitted by the signal collection apparatus as the electroencephalogram signal. For example, the electroencephalogram signal processing apparatus extracts an electroencephalogram signal from the electroencephalogram signal transmitted by the signal collection apparatus through a sliding window of a specified duration, or samples a signal from the electroencephalogram signal transmitted by the signal collection apparatus through a fixed window of a specified duration according to a preset sampling period to obtain an electroencephalogram signal. The electroencephalogram signal processing apparatus may also request the signal collection apparatus to transmit an electroencephalogram signal data segment of a specified duration at a predetermined time interval to acquire an electroencephalogram signal. In order to ensure the real-time performance of prediction based on the electroencephalogram signal, the electroencephalogram signal is an electroencephalogram signal data segment of a specified duration closest to the current time, that is, the electroencephalogram signal is an electroencephalogram signal data segment of the most recent k seconds. k may be set as needed, which may be an integer or a non-integer, such as 1 second, 2 seconds, 5 seconds, 10 seconds, 30 seconds, or 60 seconds.

Operation 420: Determine multiple time nodes in the electroencephalogram signal data segment according to a preset time interval.

Specifically, the preset time interval is configured for dividing the electroencephalogram signal data segment in time, so that the electroencephalogram signal data segment is divided into multiple time nodes in time. For example, the electroencephalogram signal is an electroencephalogram signal data segment of a duration of 4 s. The starting time of the electroencephalogram signal data segment is denoted as 0 s and the ending time is denoted as 4 s. Division is performed according to a preset time interval of 0.5 s. The time nodes of the electroencephalogram signal data segment after division include 0.5 s, 1 s, 1.5 s, 2 s, 2.5 s, 3 s, 3.5 s. The starting time of the electroencephalogram signal data segment is generally not included in the time nodes. The ending time of the electroencephalogram signal data segment may be included or may not be included in the time nodes, which may be set according to the specific need.

Operation 430: Predict an action intention corresponding to each time node based on the electroencephalogram signal data segment to obtain action intention prediction results respectively corresponding to the multiple time nodes.

Specifically, action intention prediction is performed on the electroencephalogram signal according to multiple time nodes to predict an action intention corresponding to each time node in the electroencephalogram signal.

In some embodiments, when performing action intention prediction, the electroencephalogram signal may be divided into multiple data segments according to multiple time nodes, so that one time node corresponds to one data segment. Then, action intention prediction is performed on each data segment to obtain an action intention prediction result corresponding to each time node.

In some embodiments, when dividing the electroencephalogram signal into multiple data segments according to multiple time nodes, sliding the electroencephalogram signal data segment may be performed through a sliding window, and each data segment selected in the window sliding process may be used as the data segment. The window length of the sliding window may be twice the preset time interval, and the sliding step size may be the preset time interval. For example, after an electroencephalogram signal data segment of 4 s is divided according to a preset time interval of 0.5 s, it may be denoted as [0, 0.5, 1, 1.5, 2, 2.5, 3, 3.5, 4]. The sliding window has a window length of 1 s and a sliding step size of 0.5 s. The obtained data segments include a data segment of 0-1 s, a data segment of 0.5-1.5 s, a data segment of 1-2 s, a data segment of 1.5-2.5 s, a data segment of 2-3 s, a data segment of 2.5-3.5 s, and a data segment of 3-4 s. When performing action intention prediction, an action intention prediction result corresponding to a data segment is an action intention prediction result corresponding to a time node where the intermediate time of the data segment is located. For example, the action intention prediction result of the data segment of 0-1 s is the action intention prediction result corresponding to the time node 0.5 s, the action intention prediction result of the data segment of 0.5-1.5 s is the action intention prediction result corresponding to the time node 1 s, and so on. Accordingly, when predicting the action intention prediction result corresponding to each time node, the data before and after the time node are configured for prediction, which is equivalent to performing action intention prediction through the context data of the time node, thereby improving the accuracy of the prediction result corresponding to the time node.

In some embodiments, after dividing the electroencephalogram signal into multiple data segments according to multiple time nodes, feature extractions may be performed on each data segment to obtain an electroencephalogram signal feature corresponding to each time node. Then, action intention prediction is performed according to the electroencephalogram signal feature to obtain the action intention prediction result corresponding to each time node. When performing feature extraction, sliding may be performed in the electroencephalogram signal data segment through the sliding window. Feature extraction is performed on each data segment selected in the window sliding process to obtain an electroencephalogram signal feature. The window length of the sliding window may be set to two data segments, and the sliding step size may be set to one data segment. For example, after an electroencephalogram signal data segment of 4 s may be divided according to a preset time interval of 0.5 s, it may be denoted as [0, 0.5, 1, 1.5, 2, 2.5, 3, 3.5, 4], where [0, 0.5], [0.5, 1], [1, 1.5], [1.5, 2], [2, 2.5], [2.5, 3], [3, 3.5], and [3.5, 4] are respectively denoted as data segments. When performing feature extraction, feature extraction is performed according to data segments [0, 0.5] and [0.5, 1] to obtain an electroencephalogram signal feature corresponding to the time node 0.5 s, feature extraction is performed according to data segments [0.5, 1] and [1, 1.5] to obtain an electroencephalogram signal feature corresponding to the time node 1 s, and so on, thereby obtaining the electroencephalogram signal feature corresponding to each time node. Then, action intention prediction is performed according to the electroencephalogram signal feature corresponding to each time node to obtain a corresponding action intention prediction result.

In some embodiments, time node division and action intention prediction may be achieved through a machine learning model. Machine Learning (ML) is a field interdisciplinary field, and relates to multiple disciplines such as the probability theory, statistics, the approximation theory, convex analysis, and the algorithm complexity theory. ML specializes in studying how a computer simulates or implements a human learning behavior to obtain new knowledge or skills, and reorganizes an existing knowledge structure, so as to keep improving its performance. ML is the core of artificial intelligence, is a way to make the computer intelligent, and is applied to various fields of artificial intelligence. ML and deep learning generally include technologies such as an artificial neural network, a belief network, reinforcement learning, transfer learning, inductive learning, and learning from demonstrations.

Operation 440: Determine the target action intention of a target object according to the action intention prediction result corresponding to each time node.

Specifically, the action intention prediction result corresponding to a time node indicates an action that the target object wants to execute at that time node. According to the action intention prediction result corresponding to each time node, the action that the target object needs to execute at each time node can be clearly understood, and the change in the actions that the target object needs to execute can also be seen.

In some embodiments, the action intention prediction result corresponding to a time node may be selected from the action intention prediction results corresponding to each time node as the target action intention. For example, an action intention prediction result corresponding to a time node where the intermediate time of the electroencephalogram signal is located may be selected as the target action intention, or an action intention prediction result corresponding to a time node closest to the current time may be selected as the target action intention.

In some embodiments, when selecting the action intention prediction result corresponding to a certain time node as the target action intention, the time length corresponding to the electroencephalogram signal may be used as a reference, that is, the length of the specified duration may be considered. When the specified duration is too short to switch the action, the action intention prediction result corresponding to any time node may be selected as the target action intention. When the specified duration is long and there may be action switching, the action intention prediction result corresponding to the time node closest to the current time may be selected as the target action intention.

In some embodiments, voting may be performed according to the action intention prediction result corresponding to each time node, and the action intention prediction result with maximum votes may be used as the target action intention.

In the technical solution provided in this embodiment, multiple time nodes are determined in an electroencephalogram signal data segment corresponding to an electroencephalogram signal according to a preset time interval, an action intention corresponding to each time node is predicted according to the electroencephalogram signal data segment to obtain action intention prediction results respectively corresponding to the multiple time nodes, and then a target action intention of a target object is determined according to the action intention prediction result corresponding to each time node. The action intention prediction result corresponding to each time node is equivalent to dense prediction of the action intention corresponding to the electroencephalogram signal, so that the action intention of the target object is more finely predicted and reflected, thereby improving the accuracy of action intention prediction. Moreover, in the process of action intention prediction, the accuracy of action intention prediction can be further improved by referring to the context information corresponding to each time node. Further, the action intention prediction result corresponding to each time node can clearly reflect the action switching intention of the target object within the specified duration corresponding to the electroencephalogram signal, so that the time when action switching is needed can be more accurately determined, thereby effectively improving the subsequent control of the device.

Figure 5:
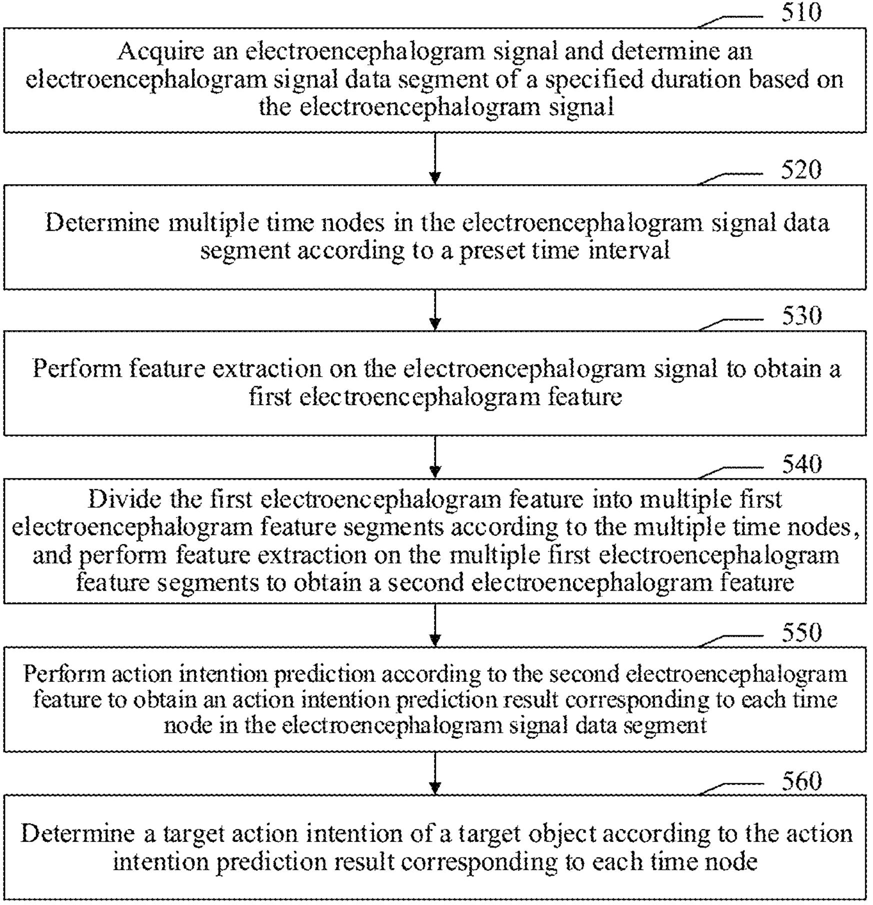
FIG. 5 schematically illustrates a flowchart of a method for processing an electroencephalogram signal according to an embodiment of this application.

FIG. 5 schematically illustrates a flowchart of a method for processing an electroencephalogram signal according to an embodiment of this application. This embodiment is a further refinement of the embodiment described above. Referring to FIG. 5, the method specifically includes operation 510 to operation 560 as follows:

Operation 510: Acquire an electroencephalogram signal and determine an electroencephalogram signal data segment of a specified duration based on the electroencephalogram signal.

Operation 520: Determine multiple time nodes in the electroencephalogram signal data segment according to a preset time interval.

Operation 510 to operation 520 are the same as the corresponding operations in the above embodiment, which will not be repeated here.

Operation 530: Perform feature extraction on the electroencephalogram signal to obtain a first electroencephalogram feature.

Specifically, feature extraction is configured for mapping the electroencephalogram signal to vector space and extracting a feature that can represent the action intention reflected in the electroencephalogram signal, thereby reducing the data dimension of the electroencephalogram signal in subsequent data processing and improving data processing efficiency. Feature extraction of the electroencephalogram signal may be achieved through a Convolutional Neural Network (CNN).

In some embodiments, performing feature extraction on the electroencephalogram signal data segment to obtain a first electroencephalogram feature includes: performing convolution processing in a time dimension on the electroencephalogram signal data segment to obtain an time feature of electroencephalogram signal; performing convolution processing in a space dimension on the time feature of electroencephalogram signal to obtain an space feature of the electroencephalogram signal; performing normalization processing on the space feature of the electroencephalogram signal to obtain a normalization processing result, and generating an intermediate feature of the electroencephalogram signal according to the normalization processing result; performing pooling processing on the intermediate feature of the electroencephalogram signal to obtain an pooling feature of the electroencephalogram signal; and performing logarithmic operation mapping on the pooling feature of the electroencephalogram signal to obtain the first electroencephalogram feature.

In some embodiments, when feature extraction is performed on the electroencephalogram signal, convolution processing in a time dimension is first performed on the electroencephalogram signal to obtain an time feature of electroencephalogram signal. Convolution processing in the time dimension is configured for aggregating neighborhood information from the time dimension through a set convolution kernel, which is equivalent to aggregating data that are closer in the time dimension to obtain an time feature of electroencephalogram signal. In this embodiment, the time dimension convolution kernel is denoted as 1*m, where m is the set convolution kernel length.

After the time feature of electroencephalogram signal is obtained, convolution processing in a space dimension is continuously performed on the time feature of electroencephalogram signal to obtain an space feature of the electroencephalogram signal. Convolution processing in the space dimension is configured for aggregating neighborhood information from the space dimension through a set convolution kernel, which is equivalent to aggregating data that are closer in the space dimension to obtain an space feature of the electroencephalogram signal.

When acquiring the electroencephalogram signal, the electroencephalogram signal collection apparatus usually includes multiple signal collectors. For example, the signal collectors are electrodes. The multiple signal collectors are placed on the brain of the target object to achieve the purpose of collecting the electroencephalogram signal of the target object. Therefore, each signal collector may collect the electroencephalogram signal at its position. A signal collector is equivalent to a signal collection channel. The electroencephalogram signal collected by a signal collector is equivalent to the electroencephalogram signal corresponding to a channel in the electroencephalogram signal of the target object. Therefore, the electroencephalogram signal includes electroencephalogram signal data segments of multiple channels.

When convolution processing in the time dimension is performed on the electroencephalogram signal, convolution processing in the time dimension is performed on the electroencephalogram signal data segment of each channel, so that the obtained time feature of electroencephalogram signal s also include the time feature of electroencephalogram signal s of multiple channels. Next, convolution processing in the space dimension is performed on the time feature of electroencephalogram signal. The space dimension is the channel dimension. This is equivalent to aggregating data that are closer in distance in the channel dimension to obtain an space feature of the electroencephalogram signal. In this embodiment, the convolution kernel of the space dimension is denoted as C*1, where C corresponds to the number of channels of the electroencephalogram signal.

After the space feature of the electroencephalogram signal is obtained, normalization processing is continuously performed on the space feature of the electroencephalogram signal to obtain a normalization processing result, and an intermediate feature of the electroencephalogram signal is generated according to the normalization processing result. Normalization processing is configured for normalizing the specific data contained in the space feature of the electroencephalogram signal to a certain range, so as to eliminate the adverse impact of abnormal data in the space feature of the electroencephalogram signal on subsequent calculation, and to accelerate the convergence speed of subsequent calculation processes. In this embodiment, Batch Normalization (BN) is configured for performing normalization processing on the space feature of the electroencephalogram signal. Batch normalization refers to dividing the data into multiple batches and then performing normalization processing on each batch. In some cases, Group Normalization (GN) may also be configured for performing normalization processing on the space feature of the electroencephalogram signal. The data after normalization processing may be used as the intermediate feature of the electroencephalogram signal for further calculation.

In some embodiments, after normalization processing is performed, a square operation may be further performed on the data after normalization processing and the result of the square operation may be used as the intermediate feature of the electroencephalogram signal. Since oscillation frequency and amplitude changes of the electroencephalogram signal (such as motor imagery electroencephalogram signal) are significant features, square operation can focus on the amplitude and frequency features of oscillation signals in the action intention prediction process, thereby improving the accuracy of action intention prediction.

After the intermediate feature of the electroencephalogram signal is obtained, pooling processing is continuously performed on the intermediate feature of the electroencephalogram signal to obtain an pooling feature of the electroencephalogram signal. The pooling process involves the following two parameters: pooling stride/step and pooling kernel/filter. The pooling process includes, by traversing the intermediate feature of the electroencephalogram signals through the pooling kernel, aggregating the feature data covered by the pooling kernel in the traversal process to obtain the pooling feature of the electroencephalogram signal. The pooling kernel moves according to a set pooling step in the traversing process. Aggregating the feature data covered by the pooling kernel may refer to taking the average or maximum value of the feature data covered by the pooling kernel.

After the pooling feature of the electroencephalogram signal is obtained, logarithmic operation mapping is continuously performed on the pooling feature of the electroencephalogram signal to obtain a first electroencephalogram feature. Logarithmic operation mapping refers to calculating the pooling feature of the electroencephalogram signal through a logarithmic function Log(x). The obtained calculation result is the first electroencephalogram feature.

Operation 540: Divide the first electroencephalogram feature into multiple first electroencephalogram feature segments according to the multiple time nodes, and perform feature extraction on the multiple first electroencephalogram feature segments to obtain a second electroencephalogram feature.

Specifically, feature extraction does not change the time dimension of the electroencephalogram signal, that is, the time length corresponding to the first electroencephalogram feature is the same as the time length corresponding to the electroencephalogram signal, both of which are a specified duration. Therefore, dividing the first electroencephalogram feature into multiple first electroencephalogram feature segments according to the multiple time nodes is equivalent to segmenting the first electroencephalogram feature according to the multiple time nodes. Each segment is a first electroencephalogram feature segment. The time length corresponding to the first electroencephalogram feature segment is a preset time interval.

After the multiple first electroencephalogram feature segments are obtained, feature extraction is performed on the multiple first electroencephalogram feature segments, that is, feature extraction is further performed on the first electroencephalogram feature segments. Feature extraction may be achieved by performing feature extraction on each first electroencephalogram feature segment, and combining the respectively extracted features to obtain a second electroencephalogram feature. It may also be achieved by performing unified feature extraction on the multiple first electroencephalogram feature segments to obtain a second electroencephalogram feature segment.

In some embodiments, the performing feature extraction on the multiple first electroencephalogram feature segments to obtain a second electroencephalogram feature includes: acquiring each group of first electroencephalogram feature segments determined based on the multiple first electroencephalogram feature segments, each group of first electroencephalogram feature segments including adjacent first electroencephalogram feature segments of the multiple first electroencephalogram feature segments; performing feature extraction on each group of first electroencephalogram feature segments to obtain a second electroencephalogram feature segment corresponding to each group of first electroencephalogram feature segments; and generating a second electroencephalogram feature according to the second electroencephalogram feature segment corresponding to each group of first electroencephalogram feature segments.

In some embodiments, the performing feature extraction on the multiple first electroencephalogram feature segments to obtain a second electroencephalogram feature includes: acquiring each group of first electroencephalogram feature segments determined based on the multiple first electroencephalogram feature segments, each group of first electroencephalogram feature segments including adjacent first electroencephalogram feature segments of the multiple first electroencephalogram feature segments; performing feature extraction on each group of first electroencephalogram feature segments to obtain a second electroencephalogram feature segment corresponding to each group of first electroencephalogram feature segments; and generating a second electroencephalogram feature according to the second electroencephalogram feature segment corresponding to each group of first electroencephalogram feature segments.

In this embodiment, when feature extraction is performed, the computer device may first divide the multiple first electroencephalogram feature segments into multiple groups of first electroencephalogram feature segments, referred to as feature segment groups. Each feature segment group includes two adjacent first electroencephalogram feature segments, and the distance between the two adjacent groups of first electroencephalogram feature segments differs by one first electroencephalogram feature segment. Then, feature extraction is performed on the first electroencephalogram feature segments in each feature segment group to obtain a second electroencephalogram feature segment corresponding to each group of first electroencephalogram feature segments. "Adjacent" refers to "adjacent" in time sequence.

For example, it is assumed that the first electroencephalogram feature segments include A1 [0, 0.5], A2 [0.5, 1], A3 [1, 1.5], A4 [1.5, 2], A5 [2, 2.5], A6 [2.5, 3], A7 [3, 3.5], A8 [3.5, 4], where A1 [0, 0.5] represents the 1st first electroencephalogram feature segment of a time length of 0-0.5 s. During grouping, the first electroencephalogram feature segment A1 and the first electroencephalogram feature segment A2 are the first group of first electroencephalogram feature segments, the first electroencephalogram feature segment A2 and the first electroencephalogram feature segment A3 are the second group of first electroencephalogram feature segments, the first electroencephalogram feature segment A3 and the first electroencephalogram feature segment A4 are the third group of first electroencephalogram feature segments, and so on, so that seven groups of first electroencephalogram feature segments can be obtained. Then, feature extraction is performed on the first group of first electroencephalogram feature segments to obtain the 1st second electroencephalogram feature segment B1; feature extraction is performed on the second group of first electroencephalogram feature segments to obtain the 2nd second electroencephalogram feature segment B2; feature extraction is performed on the third group of first electroencephalogram feature segments to obtain the 3rd second electroencephalogram feature segment B3; and so on, so that seven second electroencephalogram feature segments B1-B7 can be obtained, which respectively correspond to the seven time nodes of 0.5 s, 1 s, 1.5 s, 2 s, 2.5 s, 3 s, and 3.5 s.

After the second electroencephalogram feature segments are obtained, a second electroencephalogram feature may be generated according to the second electroencephalogram feature segment corresponding to each group of first electroencephalogram feature segments. For example, all second electroencephalogram feature segments are spliced in a time sequence to obtain a second electroencephalogram feature.

Accordingly, the second electroencephalogram feature segment corresponding to each time node includes both the feature data in the first electroencephalogram feature segment before the time node and the feature data in the first electroencephalogram feature segment after the time node. This means that the second electroencephalogram feature segment corresponding to each time node is obtained by referencing the context information of the time node, so that the action intention prediction structure of each time node can be predicted according to the context information of the corresponding time node, thereby improving the accuracy of the prediction result.

Operation 550: Perform action intention prediction according to the second electroencephalogram feature to obtain an action intention prediction result corresponding to each time node in the electroencephalogram signal data segment.

Specifically, action intention prediction according to the second electroencephalogram feature may be achieved through a Long Short-Term Memory (LSTM) network.

In some embodiments, the performing action intention prediction according to the second electroencephalogram feature to obtain an action intention prediction result corresponding to each time node in the electroencephalogram signal data segment includes: performing action intention prediction according to the second electroencephalogram feature segment and context features of the second electroencephalogram feature segment to obtain an action intention prediction feature corresponding to a time node corresponding to the second electroencephalogram feature segment; and performing linear transformation on the action intention prediction feature corresponding to the time node corresponding to each second electroencephalogram feature segment to obtain the action intention prediction result corresponding to each time node in the electroencephalogram signal data segment.

When performing action intention prediction, LSTM will combine the second electroencephalogram feature segment and context features of the second electroencephalogram feature segment to perform action intention prediction to obtain an action intention prediction feature corresponding to a time node corresponding to the second electroencephalogram feature segment. The context features of the second electroencephalogram feature segment are determined by LSTM in the process of performing action intention prediction. LSTM is a neural network composed of multiple cells. Each cell includes a forget gate, an input gate, and an output gate. The forget gate of an $i^{th}$ cell is configured to determine the part of the state information of an $(i-1)^{th}$ cell that needs to be forgotten, and select the part of the state information of the $(i-1)^{th}$ cell that needs to be retained to participate in calculation. The input gate of the $i^{th}$ cell is configured to determine which new information needs to be added to the state information of the $i^{th}$ cell according to the action intention prediction features of an $i^{th}$ second electroencephalogram feature segment and an $(i-1)^{th}$ second electroencephalogram feature segment, that is, to determine update information. The part determined by the forget gate that needs to be retained is combined with the update information determined by the input gate to obtain the state information of the $i^{th}$ cell. The output gate is configured to obtain a determination condition according to the action intention prediction features of the $i^{th}$ second electroencephalogram feature segment and the $(i-1)^{th}$ second electroencephalogram feature segment, and then fuse the determination condition with the state information of the $i^{th}$ cell to obtain the action intention prediction feature of the $i^{th}$ second electroencephalogram feature segment. LSTM makes a reference to the information of the $(i-1)^{th}$ second electroencephalogram feature segment in the process of performing action intention prediction on the $i^{th}$ second electroencephalogram feature segment, that is, combines the second electroencephalogram feature segment and the context features of the second electroencephalogram feature segment to perform action intention prediction, thereby effectively improving the accuracy of action intention prediction and ensuring the accuracy of long-term action intention prediction.

After the action intention prediction feature corresponding to the time node corresponding to each second electroencephalogram feature segment is obtained, linear transformation is performed on each action intention prediction feature to obtain an action intention prediction result corresponding to each time node in the electroencephalogram signal data segment. The action intention prediction result corresponding to each time node includes a probability that the action intention at the corresponding time node is a preset action. Assuming there are four preset actions, the action intention prediction result corresponding to a certain time node includes probabilities that the action intention at the time node is respectively the four preset actions, and the sum of the probabilities of the four preset actions is 1.

Operation 560: Determine a target action intention of a target object according to the action intention prediction result corresponding to each time node.

In some embodiments, an action intention prediction result corresponding to a time node closest to a current time of the multiple time nodes may be used as the target action intention. For example, action intention prediction is performed to obtain action intention prediction results corresponding to time nodes 0.5 s, 1 s, 1.5 s, 2 s, 2.5 s, 3 s, and 3.5 s, the time node closest to the current time is 3.5 s, and then the action intention prediction result corresponding to 3.5 s is used as the target action intention.

In some embodiments, the action intention prediction result corresponding to each time node in the electroencephalogram signal data segment includes a probability that the action intention corresponding to each time node is a preset action, so the target action intention of the target object is a preset action with a maximum probability in the action intention prediction result corresponding to the time node closest to the current time. For example, the action intention prediction result corresponding to time node 3.5 s includes [0.7, 0.1, 0.1, 0.1], indicating that a probability the action intention corresponding to time node 3.5 s being a first preset action is 0.7, a probability of being a second preset action is 0.1, a probability of being a third preset action is 0.1, and a probability of being a fourth preset action is 0.1. Clearly, the probability of being the first preset action is the maximum, so the target action intention of the target object is the first preset action.

In the technical solution provided in this embodiment, based on the dividing method and feature extraction method of the first electroencephalogram feature segment, the second electroencephalogram feature segment corresponding to each time node is obtained with reference to the context information of the time node, so that the action intention prediction structure of each time node can be predicted according to the context information of the corresponding time node, thereby improving the accuracy of the prediction result.

In some embodiments, after the action intention prediction result corresponding to each time node is obtained, the technical solution in this application may further include: performing filtering processing on the action intention prediction result corresponding to each time node in the electroencephalogram signal data segment to obtain a filtered action intention prediction result corresponding to each time node in the electroencephalogram signal data segment; and determining a target action intention of a target object according to the filtered action intention prediction result corresponding to each time node.

Specifically, the filtering method may be median filtering, Kalman filtering, and the like. In consideration of the adverse impact of algorithm jitter in the action intention prediction process, performing filtering processing on the action intention prediction result corresponding to each time node in the electroencephalogram signal data segment can enable the filtered action intention prediction result corresponding to each time node to transition smoothly, thereby eliminating the impact of abnormal data, and further improving the accuracy of the determined target action intention of the target object.

In some embodiments, the method for processing an electroencephalogram signal further includes: acquiring a sample electroencephalogram signal of a known action intention; determining multiple sample time nodes in the sample electroencephalogram signal according to the preset time interval, and generating an action intention label corresponding to each sample time node according to the known action intention; performing feature extraction and mapping processing on the sample electroencephalogram signal through a prediction model to obtain an action prediction result corresponding to each sample time node in the sample electroencephalogram signal; and updating model parameters of the prediction model according to the action prediction result and the action intention label corresponding to each sample time node in the sample electroencephalogram signal to obtain an action intention prediction model, where the action intention prediction model is configured to perform action intention prediction on the electroencephalogram signal data segment, or the action intention prediction model is configured to perform time node division and action intention prediction on the electroencephalogram signal data segment. This embodiment will be described in detail in subsequent embodiments.

In some embodiments, the action intention prediction result corresponding to each time node in the electroencephalogram signal data segment includes a probability that the action intention corresponding to each time node is a preset action, and the method for processing an electroencephalogram signal further includes: acquiring a maximum probability value in the action intention prediction result corresponding to each time node; using a preset action corresponding to the maximum probability value corresponding to each time node as an action intention label corresponding to each time node when a minimum value of maximum probability values respectively corresponding to the multiple time nodes is greater than or equal to a preset probability threshold; and adding an electroencephalogram signal with the action intention label to a historical data set, the historical data set being configured for training the action intention prediction model. This embodiment will be described in detail in subsequent embodiments.

In some embodiments, data corresponding to each preset action are acquired from the historical data set to generate a training data set when a data volume in the historical data set is greater than a preset quantity and a duration that the action intention prediction model has been used reaches a preset duration, where a difference between acquired data volumes corresponding to any two preset actions is less than or equal to the preset threshold; and the action intention prediction model is trained by using the training data set to update model parameters of the action intention prediction model. This embodiment will be described in detail in subsequent embodiments.

In some embodiments, the acquiring an sample electroencephalogram signal of a known action intention includes: acquiring an original electroencephalogram signal of a known action intention, the original electroencephalogram signal including electroencephalogram signals of multiple channels; sequentially performing bandpass filtering, downsampling, and channel data standardization processing on the original electroencephalogram signal to obtain a first preprocessed electroencephalogram signal; calculating a mean of channel data corresponding to each time in the first preprocessed electroencephalogram signal, and subtracting a corresponding mean of channel data from the electroencephalogram signal of each channel at each time to obtain second preprocessed electroencephalogram signals; traversing the second preprocessed electroencephalogram signals through a sliding window of a specified duration to obtain candidate electroencephalogram signals, where a sliding step size of the sliding window is less than the specified duration; and performing alignment processing on the candidate electroencephalogram signals to obtain the sample electroencephalogram signal of the known action intention. This embodiment will be described in detail in subsequent embodiments.

In some embodiments, the method for processing an electroencephalogram signal further includes: performing filtering processing on the action intention prediction result corresponding to each time node in the electroencephalogram signal data segment to obtain a filtered action intention prediction result corresponding to each time node in the electroencephalogram signal data segment; the determining a target action intention according to the action intention prediction results respectively corresponding to the multiple time nodes including: determining a target action intention of a target object according to the filtered action intention prediction result corresponding to each time node.

In some embodiments, the determining a target action intention according to the action intention prediction results respectively corresponding to the multiple time nodes includes: using an action intention prediction result corresponding to a time node closest to a current time of the multiple time nodes as the target action intention.

In some embodiments, the action intention prediction result corresponding to each time node in the electroencephalogram signal data segment includes a probability that the action intention corresponding to each time node is a preset action; and the using an action intention prediction result corresponding to a time node closest to a current time of the multiple time nodes as the target action intention includes: using a preset action with a maximum probability in the action intention prediction result corresponding to the time node closest to the current time as the target action intention.

Figure 6:
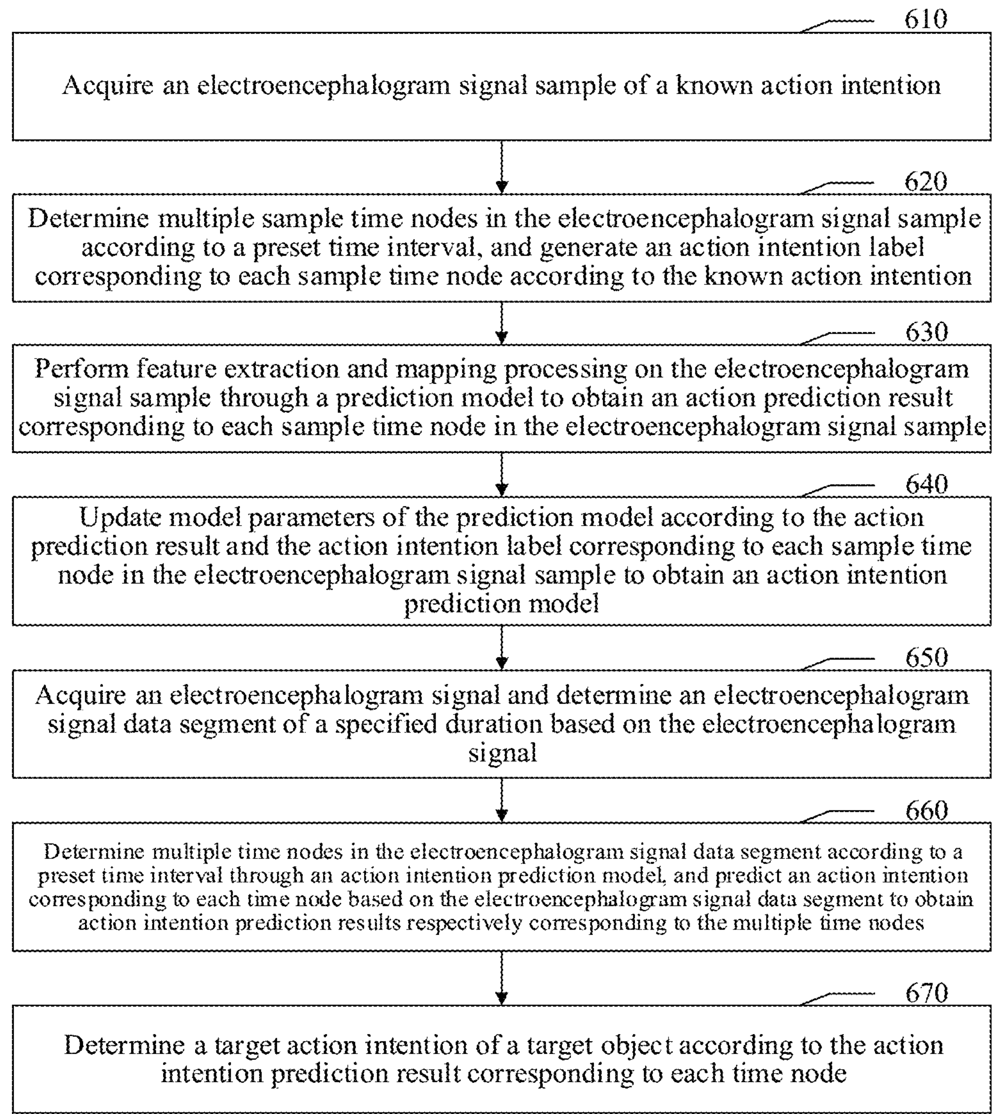
FIG. 6 schematically illustrates a flowchart of a method for processing an electroencephalogram signal according to an embodiment of this application.

FIG. 6 schematically illustrates a flowchart of a method for processing an electroencephalogram signal according to an embodiment of this application. This embodiment is a further refinement of the embodiment described above. Referring to FIG. 6, the method specifically includes operation 610 to operation 670 as follows:

Operation 610: Acquire an sample electroencephalogram signal of a known action intention.

Specifically, the sample electroencephalogram signal is an electroencephalogram signal and is used as a sample to train the action intention prediction model.

Figure 7:
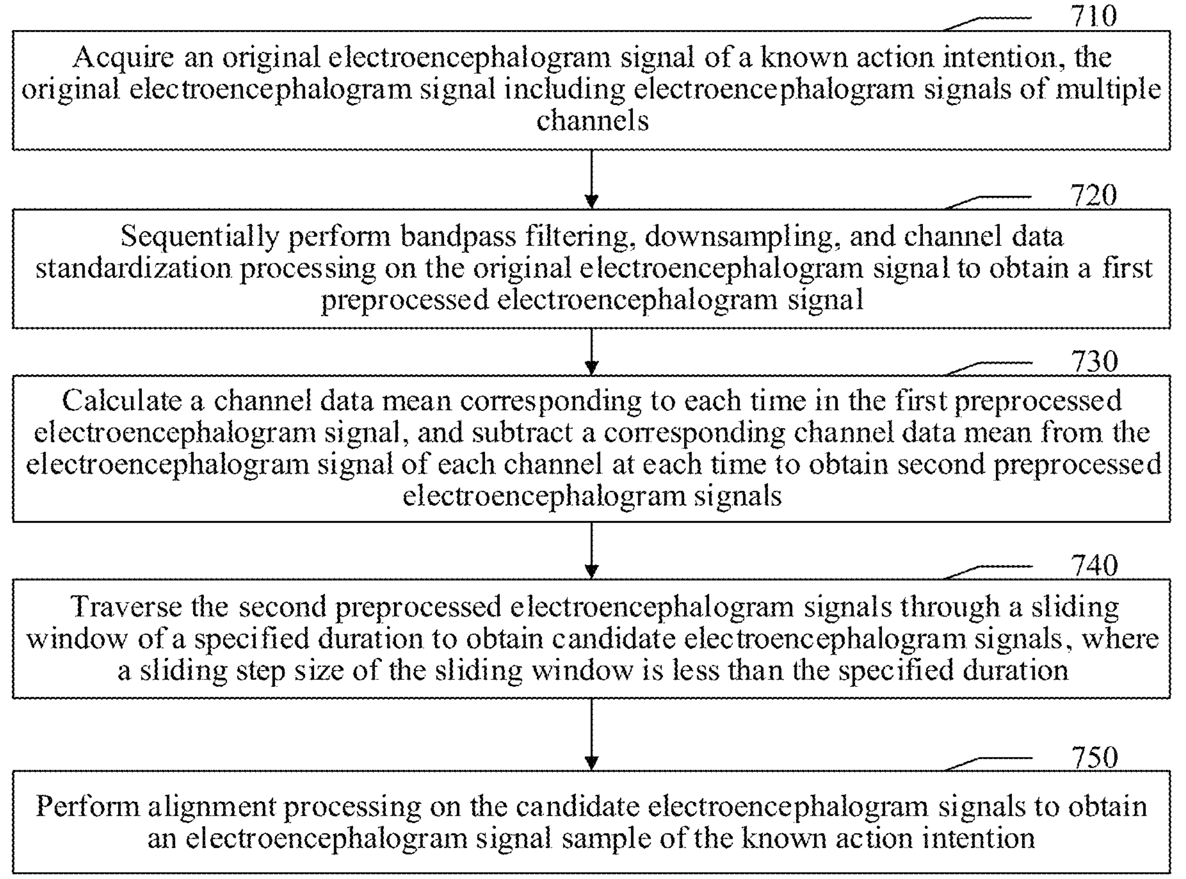
FIG. 7 schematically illustrates a flowchart of a process of preprocessing a sample electroencephalogram signal according to an embodiment of this application.

In some embodiments, preprocessing may also be performed on the sample electroencephalogram signal after the sample electroencephalogram signal is acquired. FIG. 7 schematically illustrates a flowchart of a process of preprocessing an sample electroencephalogram signal according to an embodiment of this application. Referring to FIG. 7, the process of preprocessing specifically includes operation 710 to operation 750 as follows:

Operation 710: Acquire an original electroencephalogram signal of a known action intention, the original electroencephalogram signal including electroencephalogram signals of multiple channels.

Specifically, the electroencephalogram signal of a channel in the original electroencephalogram signal represents the electroencephalogram signal data collected by a signal collector in the electroencephalogram signal collection apparatus. Usually, the signal collection apparatus has multiple signal collectors, so the original electroencephalogram signal includes electroencephalogram signals of multiple channels.

Operation 720: Sequentially perform bandpass filtering, downsampling, and channel data standardization processing on the original electroencephalogram signal to obtain a first preprocessed electroencephalogram signal.

Specifically, bandpass filtering is configured for removing high and low frequency noise in the original electroencephalogram signal. For example, by performing filtering processing using a bandpass filter of 2 Hz-40 Hz, noise data with frequencies below 2 Hz and above 40 Hz in the original electroencephalogram signal can be removed.

downsampling is configured for reducing the data volume of the original electroencephalogram signal to facilitate subsequent calculation. For example, the original electroencephalogram signal of 1000 Hz is down-sampled to 250 Hz.

Channel data standardization processing refers to converting the electroencephalogram signal of each channel in the original electroencephalogram signal into a distribution with an average value being a first preset value and a standard deviation being a second preset value, to solve the problem of signal drift.

In some embodiments, the Exponential Moving Average (EMA) algorithm may be configured for channel data standardization processing. Taking the standardization of an electroencephalogram signal of a channel as an example, using $x_k$ to represent a standardized electroencephalogram signal of the channel at time k, using $\tilde{x}_k$ to represent an electroencephalogram signal of the channel at time k, using $\mu_k$ to represent a mean of the channel at time k, and using $\sigma_k$ to represent a variance of the channel at time k, the following can be obtained:

$$x_k = \frac{\tilde{x}_k - \mu_k}{\sqrt[2]{\sigma_k^2}}$$

$$\sigma_k^2 = (1-\beta)(\tilde{x}_k - \mu_k)^2 + \beta\sigma_{k-1}^2$$

$$\mu_k = (1-\beta)\tilde{x}_k + \beta\mu_{k-1}$$

where β is an update factor, the larger the β, the slower the update speed of the mean and variance, and the value range of β is (0, 1], and is generally set between 0.99-0.999.

Operation 730: Calculate a mean of channel data corresponding to each time in the first preprocessed electroencephalogram signal, and subtract a corresponding mean of channel data from the electroencephalogram signal of each channel at each time to obtain second preprocessed electroencephalogram signals.

Specifically, the mean of channel data corresponding to each time in the first preprocessed electroencephalogram signal refers to dividing the sum of all channel data by the total number of channels at each time to obtain the mean of channel data corresponding to each time. For example, assuming there are a total of c channels from Cl to Cc, and the data of channel i at time t is denoted as Cit, then the mean of channel data at time t is $$\sum_{i=1}^{c} Cit/c.$$

Then, a corresponding mean of channel data is subtracted from the electroencephalogram signal of each channel at each time. For example, taking channel i as an example, the mean of channel data of channel i at time t is yi, and then the electroencephalogram signal of channel i at time t in the second preprocessed electroencephalogram signal is Cit−yi.

Operation 740: Traverse the second preprocessed electroencephalogram signals through a sliding window of a specified duration to obtain candidate electroencephalogram signals, where a sliding step size of the sliding window is less than the specified duration.

Specifically, data extraction is performed on the second preprocessed electroencephalogram signals by traversing through a sliding window of a specified duration to obtain candidate electroencephalogram signals of a time length which is a specified duration. Since the sliding step size of the sliding window is less than the specified duration, there may be duplicate electroencephalogram signal data segments between the candidate electroencephalogram signals.

Operation 750: Perform alignment processing on the candidate electroencephalogram signals to obtain the sample electroencephalogram signal of the known action intention.

Specifically, when alignment processing is performed on the candidate electroencephalogram signals, a reference matrix of the candidate electroencephalogram signals is first calculated by using the following method:

$$\tilde{R}_{T_n} = \alpha\tilde{R}_{T_{n-1}} + (1-\alpha)X_{T_n}X_{T_n}^T$$

where $X_{T_n}$ represents a candidate electroencephalogram signal with the starting time or ending time of $T_n$, $\tilde{R}_{T_n}$ is a reference matrix at time $T_n$, and $\tilde{R}_{T_{n-1}}$ is a reference matrix at time $T_{n-1}$. α is an update factor, the larger the α, the slower the update speed of the mean and variance, and the value range of α is (0, 1], and is generally set between 0.99-0.999. α and β may be the same or different, β reflects an update speed of the mean and variance of a channel, and a reflects an update speed of the mean and variance of all channels of the candidate electroencephalogram signals.

After the reference matrix is calculated, alignment processing may be performed on the candidate electroencephalogram signals, as shown in the following equation:

$$\tilde{X}_{T_n} = \tilde{R}_{T_n}^{-1/2}X_{T_n}^T$$

where $\tilde{X}_{T_n}$ represents data after the candidate electroencephalogram signals $X_{T_n}$ are aligned. After alignment, it can be ensured that a covariance matrix of all data average channels tends towards a unit matrix.

By preprocessing the sample electroencephalogram signal, abnormal data can be removed, helping to improve the accuracy of subsequent model training. When action intention prediction is performed on the electroencephalogram signal, preprocessing as shown in FIG. 7 may also be performed on the electroencephalogram signal.

Continuously referring to FIG. 6, operation 620: determine multiple sample time nodes in the sample electroencephalogram signal according to the preset time interval, and generate an action intention label corresponding to each sample time node according to the known action intention.

Specifically, the process of dividing the sample electroencephalogram signal into the sample time nodes according to the preset time interval is the same as the process of dividing the electroencephalogram signal into the time nodes, which will not be repeated here. Since the action intention of the sample electroencephalogram signal is known, the action intention corresponding to each sample time node is known, and an action intention label corresponding to each sample time node can be generated.

Continuously referring to FIG. 6, operation 630: perform feature extraction and mapping processing on the sample electroencephalogram signal through a prediction model to obtain an action prediction result corresponding to each sample time node in the sample electroencephalogram signal.

Specifically, for the process of performing feature extraction on the sample electroencephalogram signal through the prediction model, a reference may be made to the process of performing action intention prediction on the electroencephalogram signal described above, which will not be repeated here.

Continuously referring to FIG. 6, operation 640: update model parameters of the prediction model according to the action prediction result and the action intention label corresponding to each sample time node in the sample electroencephalogram signal to obtain an action intention prediction model.

Specifically, since each sample time node has an action intention label, after the action prediction result corresponding to the sample time node is obtained, whether the model is accurate for the action intention corresponding to the sample time node can be determined according to a difference between the action prediction result and the action intention label. The difference between the action prediction result and the action intention label is equivalent to the loss function of the model. When the loss function is less than a preset threshold, the model prediction result is not accurate enough. In this case, the model parameters are to be updated and the model is to continue to be trained until the loss function is less than the preset threshold or the quantity of model iterations reaches a preset quantity, to obtain a well-trained action intention prediction model. Subsequently, the action intention prediction model can be configured for performing action intention prediction on the electroencephalogram signal, or the action intention prediction model can be configured for performing time node division and action intention prediction on the electroencephalogram signal.

In some embodiments, when calculating the loss function, the loss function of each sample time node is to be calculated separately according to the action prediction result and action intention label corresponding to each sample time node, and then the loss function of the model is calculated according to the loss function of each sample time node.

Figure 8:
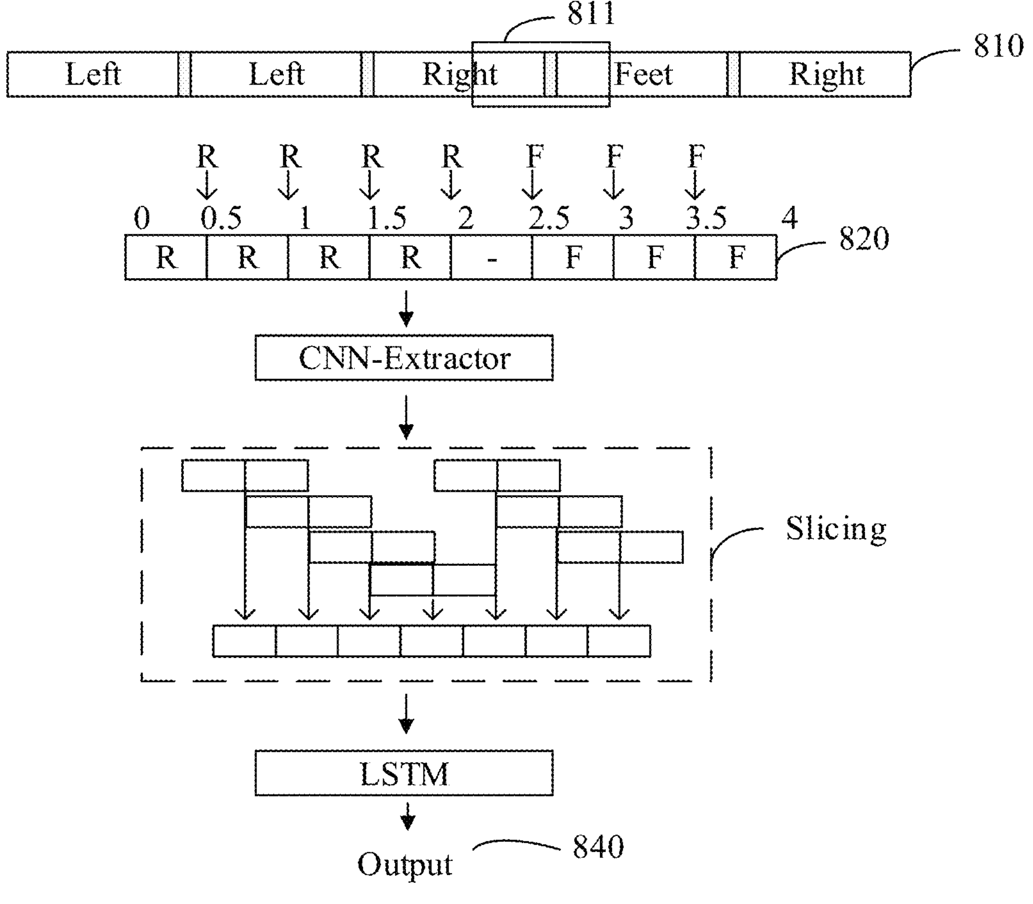
FIG. 8 schematically illustrates a schematic diagram of a process of training a model according to an embodiment of this application.

For example, FIG. 8 schematically illustrates a schematic diagram of a process of training a model according to an embodiment of this application. The preset actions in this embodiment include moving the left hand (Left), moving the right hand (Right), moving the feet (Feet), and resting (Rest). The corresponding action intention labels are respectively L, R, F, and Re. Referring to FIG. 8, for a preprocessed original electroencephalogram signal 810 of a known action intention, an sample electroencephalogram signal 820 is obtained therefrom through a sliding window 811 of a specified duration. Assuming the time length of the sample electroencephalogram signal 820 is 4 s, multiple time nodes are determined in the sample electroencephalogram signal 820 according to an interval of 0.5 s, and an action intention label is assigned to each time node. For example, referring to FIG. 8, a label R is assigned at 0.5 s, and a label F is assigned at 3 s.

Figure 9:
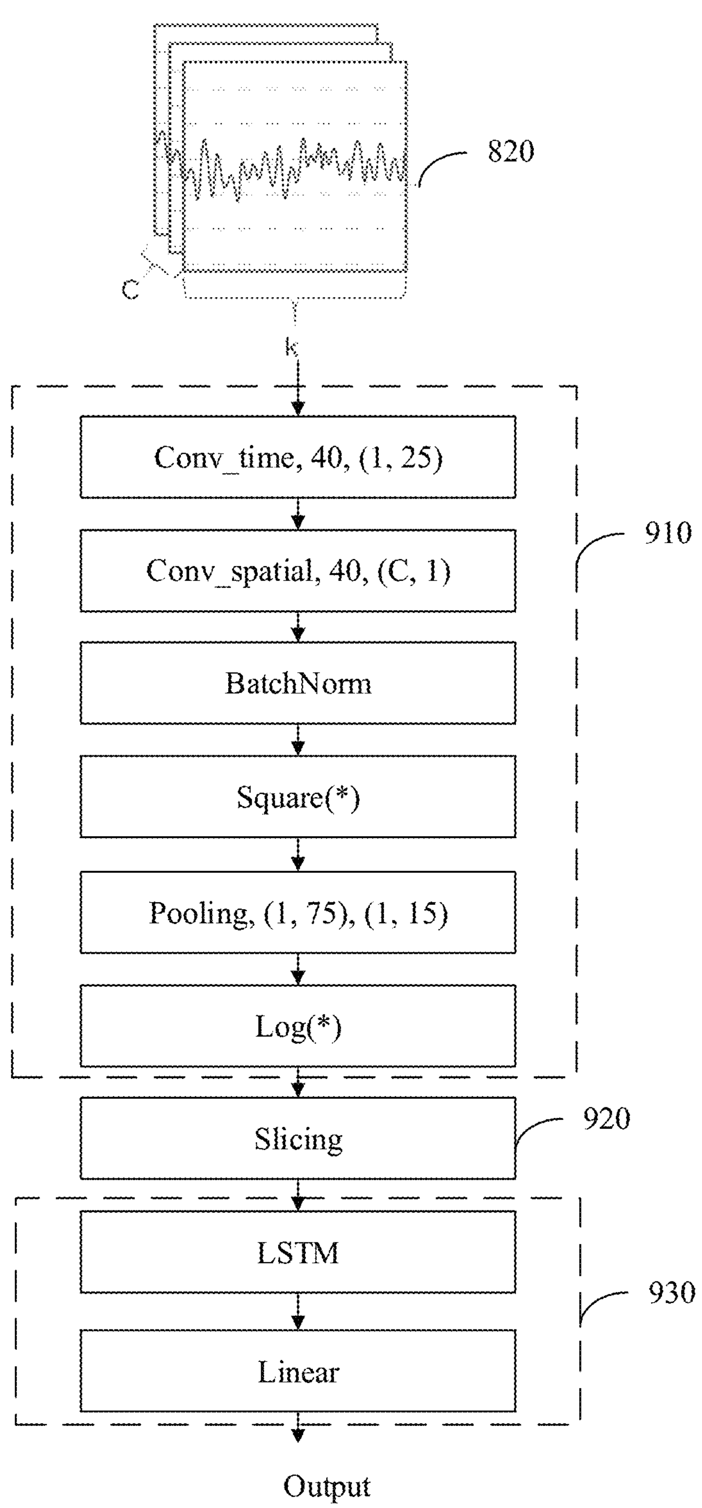
FIG. 9 schematically illustrates a structural block diagram of a prediction model according to an embodiment of this application.

Then, the sample electroencephalogram signal 820 with multiple action intention labels is inputted into the prediction model. The structural diagram of the prediction model is shown in FIG. 9. The prediction model includes a CNN feature extraction module 910 (CNN-Extractor), a feature extraction module 920 (Slicing), and an LSTM prediction module 930. The CNN feature extraction module 910 includes a temporal convolutional layer (Conv_time), a spatial convolutional module layer (Conv_spatial), a batch normalization layer (BatchNorm), a square operation layer (Square), a pooling layer (Pooling), and a logarithmic operation mapping layer (Log). The LSTM prediction module includes an LSTM prediction layer (LSTM) and a linear transformation layer (Linear).

Referring to FIG. 8 and FIG. 9, the sample electroencephalogram signal 820 with multiple action intention labels is first inputted into the CNN feature extraction module 910, and the CNN feature extraction module 910 performs feature extraction on the sample electroencephalogram signal 820. In the process of feature extraction, a first sample electroencephalogram feature is obtained sequentially through temporal convolution, spatial convolution, batch normalization, square operation, pooling processing, and logarithmic operation mapping. The feature dimension of temporal convolution is 40, and the convolution kernel is 1*25. The feature dimension of spatial convolution is 40, the convolution kernel is C*1, and C is the number of channels of the sample electroencephalogram signal. In the pooling layer, the pooling step size is (1, 15) and the pooling kernel is (1, 75). The "1" in these two parameters can be understood as the number of rows involved in the calculation is 1, that is, the step size is 15 and the pooling kernel is 75. The first sample electroencephalogram feature may be denoted as N*40*7, N is the sequence number of the sample electroencephalogram signal 820, 40 represents the data dimension, and 7 represents seven time nodes.

After the first sample electroencephalogram feature is obtained, the feature extraction module 920 (Slicing) performs feature extraction. Specifically, the first sample electroencephalogram feature is divided into multiple segments, and then adjacent two first sample electroencephalogram feature segments are considered as a group, and feature extraction is performed to each group to obtain second sample electroencephalogram feature segments, which are then spliced into a second sample electroencephalogram feature 830.

Finally, the LSTM prediction module 930 performs action intention prediction on the second sample electroencephalogram feature 830, and outputs a sample action intention prediction result 840 (Output). The sample action intention prediction result 840 may be expressed as N*cls*m, where cls is the total number of preset actions, which is 4 here; m is the number of dense points, i.e., the total number of time nodes, which is 7 here.

Since oscillation frequency and amplitude changes of the electroencephalogram signal (such as motor imagery electroencephalogram signal) are significant features, adding a square operation layer to the model can enhance the amplitude and frequency features of oscillation signals. Adding a logarithmic operation mapping layer can stabilize model training and improve the prediction effect.

Continuously referring to FIG. 6, operation 650: acquire an electroencephalogram signal and determine an electroencephalogram signal data segment of a specified duration based on the electroencephalogram signal.

Continuously referring to FIG. 6, operation 660: determine multiple time nodes in the electroencephalogram signal data segment according to a preset time interval through an action intention prediction model, and predict an action intention corresponding to each time node based on the electroencephalogram signal data segment to obtain action intention prediction results respectively corresponding to the multiple time nodes.

Continuously referring to FIG. 6, operation 670: determine a target action intention of a target object according to the action intention prediction result corresponding to each time node.

Operation 650 to operation 670 are the same as the corresponding operations in the above embodiment, which will not be repeated here.

Figure 10:
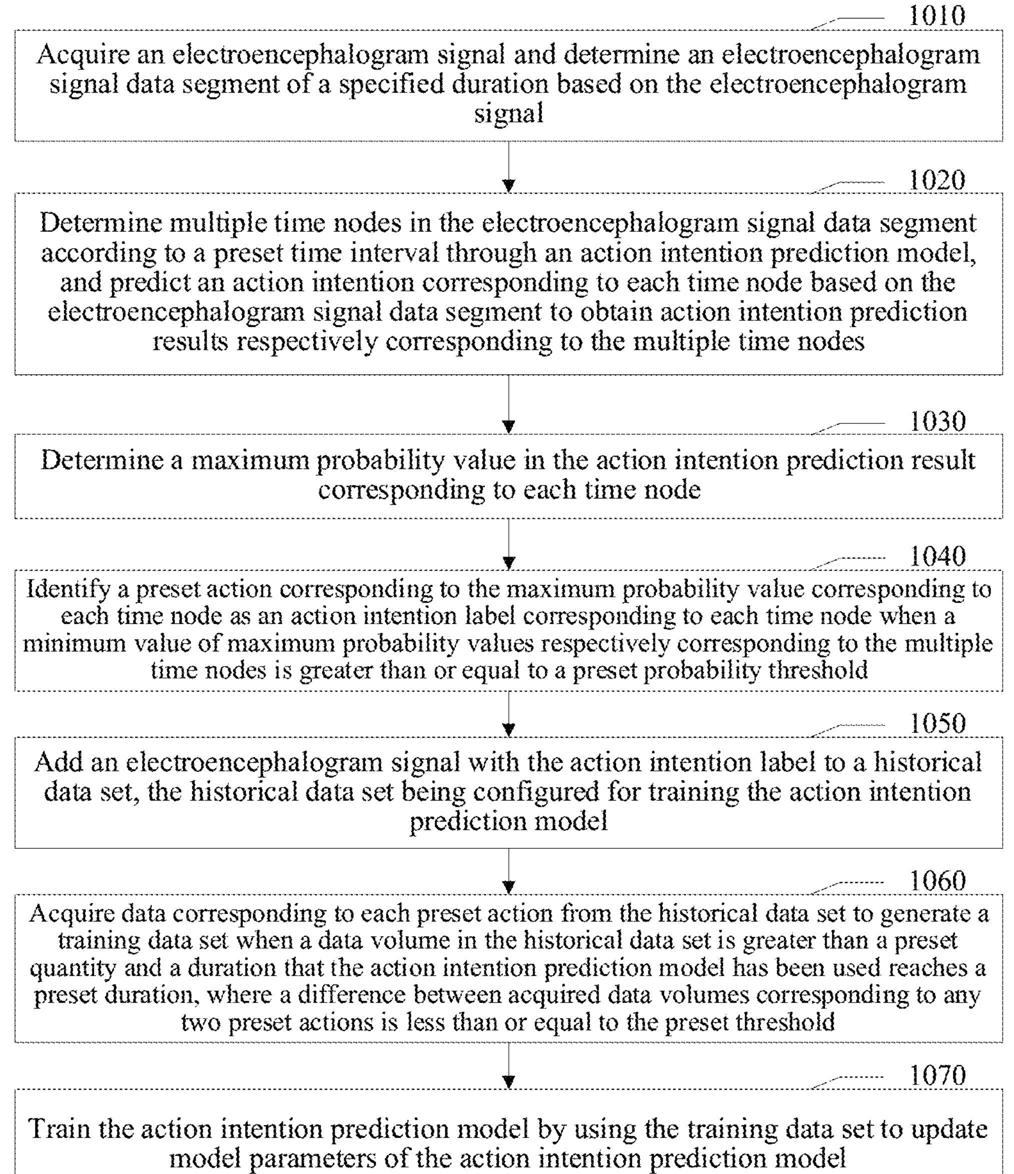
FIG. 10 schematically illustrates a flowchart of a method for processing an electroencephalogram signal according to an embodiment of this application.

FIG. 10 schematically illustrates a flowchart of a method for processing an electroencephalogram signal according to an embodiment of this application. This embodiment is a further optimization of the embodiment described above. Referring to FIG. 10, the method for processing an electroencephalogram signal according to this embodiment specifically includes operation 1010 to operation 1070 as follows:

Operation 1010: Acquire an electroencephalogram signal and determine an electroencephalogram signal data segment of a specified duration based on the electroencephalogram signal.

Operation 1020: Determine multiple time nodes in the electroencephalogram signal data segment according to a preset time interval through an action intention prediction model, and predict an action intention corresponding to each time node based on the electroencephalogram signal data segment to obtain action intention prediction results respectively corresponding to the multiple time nodes.

Operation 1010 to operation 1020 are the same as the corresponding operations in the above embodiment, which will not be repeated here.

Operation 1030: Determine a maximum probability value in the action intention prediction result corresponding to each time node.

Specifically, the action intention prediction result corresponding to each time node includes a probability that the action intention corresponding to each time node is a preset action. The sum of all probabilities corresponding to a time node is 1. The preset action corresponding to the maximum probability value corresponding to a time node is the action intention corresponding to the time node.

Operation 1040: Identify a preset action corresponding to the maximum probability value corresponding to each time node as an action intention label corresponding to each time node when a minimum value of maximum probability values respectively corresponding to the multiple time nodes is greater than or equal to a preset probability threshold.

Specifically, the action intention corresponding to a time node is the preset action indicated by the maximum probability value corresponding to the time node. When the maximum probability value corresponding to a time node is greater than or equal to the preset probability threshold, it indicates that the model can clearly recognize the action intention corresponding to the target time node, which means that the action intention prediction model is accurate in predicting the action intention corresponding to the target time node. Therefore, when maximum probability values respectively corresponding to the multiple time nodes are all greater than or equal to the preset probability threshold, that is, the minimum value of maximum probability values respectively corresponding to the multiple time nodes is greater than or equal to the preset probability threshold, it indicates that the action intention prediction model is accurate in all the action intention prediction results corresponding to each time node in the electroencephalogram signal data segment. Therefore, the preset action indicated by the maximum probability value corresponding to each time node may be set as an action intention label corresponding to each time node, and the electroencephalogram signal with the label may be subsequently added to the historical data set.

For example, there are four types of preset actions. Assuming that the action intention prediction result corresponding to time node 1 is (0.7, 0.1, 0.1, 0.1), and the preset probability threshold is set to 0.5, the maximum probability value of 0.7 corresponding to time node 1 is greater than the preset probability threshold of 0.5. This also indicates that the difference between the maximum probability value and other probability values is large. The action intention prediction model recognizes that the action intention corresponding to this time node is more likely to be the first preset action, and is unlikely to be the other three preset actions. This indicates that the model is more certain about the action intention corresponding to time node 1, and it can be considered that the model's prediction result corresponding to time node 1 is accurate. If the maximum probability value corresponding to time node 1 is the minimum value of maximum probability values respectively corresponding to the multiple time nodes in the electroencephalogram signal, then an action intention prediction label may be set for each time node according to the maximum probability value. Assuming the action intention prediction result corresponding to time node 2 is (0.3, 0.2, 0.3, 0.2), the maximum probability value of 0.3 corresponding to time node 2 is less than the preset probability threshold of 0.5. This also indicates that the difference between the maximum probability value and other probability values is small. The action intention prediction model considers that the probabilities that the action intention corresponding to time node 2 is the four preset actions are almost the same, which means that the action intention prediction model cannot accurately recognize the action intention corresponding to time node 2, that is, the action intention prediction result is not accurate. Therefore, it is not suitable for assigning an action intention label according to the action intention prediction result. If the maximum probability value corresponding to each time node in the electroencephalogram signal, for example, the action intention prediction result corresponding to time node 2, is less than the preset probability threshold, then the electroencephalogram signal is not suitable for setting an action intention label.

Operation 1050: Add an electroencephalogram signal with the action intention label to a historical data set, the historical data set being configured for training the action intention prediction model.

Specifically, an electroencephalogram signal with the action intention label is added as an sample electroencephalogram signal to the historical data set, so that the sample electroencephalogram signal in the historical data set can be configured for training the action intention prediction model, thereby expanding the sample data for model training and reducing the pressure in acquiring the sample data.

Operation 1060: Acquire data corresponding to each preset action from the historical data set to generate a training data set when a data volume in the historical data set is greater than a preset quantity and a duration that the action intention prediction model has been used reaches a preset duration, where a difference between acquired data volumes corresponding to any two preset actions is less than or equal to the preset threshold.

Specifically, when a data volume in the historical data set is greater than a preset quantity, it indicates that the action intention prediction model has already performed action intention prediction on a large number of electroencephalogram signals. Moreover, when a duration that the action intention prediction model has been used reaches a preset duration, it indicates that the model parameters obtained from the previous training of the action intention prediction model have been configured for a long time. In this case, a training data set may be generated to update the model parameters to ensure the accuracy of the action intention prediction model in subsequent use.

In consideration of the accuracy of data prediction corresponding to various preset actions, when the training data set is generated, the sample electroencephalogram signal corresponding to each preset action is to be acquired from the historical data set. In addition, it is necessary to ensure that the data volume corresponding to each preset action is the same, that is, the difference between acquired data volumes corresponding to any two preset actions is less than or equal to the preset threshold. Accordingly, the model training process can learn an equal quantity of information for each preset action, so that the model has the same ability of predicting each preset action, thereby avoiding the situation that some preset actions can be accurately predicted while some other preset actions cannot be accurately predicted.

In some embodiments, when the training data set is generated, in addition to acquiring data from the historical data set, data may also be acquired from previous sample data for training the model. For example, data are acquired from sample data for training the model for the first time.

Operation 1070: Train the action intention prediction model by using the training data set to update model parameters of the action intention prediction model.

Specifically, after the training data set is obtained, the action intention prediction model may be retrained by using the training data set. New model parameters are obtained according to the training result, and updating is performed based on the new model parameters. Subsequently, the action intention prediction model with updated data may be configured for performing action intention prediction on an electroencephalogram signal.

In this embodiment, by adding an electroencephalogram signal with the action intention label to the historical data set, expands the sample data for model training and effectively reduces the pressure in acquiring the sample data. Moreover, when a data volume in the historical data set is greater than a preset quantity and a duration that the action intention prediction model has been used reaches a preset duration, the model is retrained to update the model parameters, so that the model parameters can continuously learn the feature of the electroencephalogram signal under prediction at current, thereby improving the long-term online prediction accuracy of the model.

Figure 11:
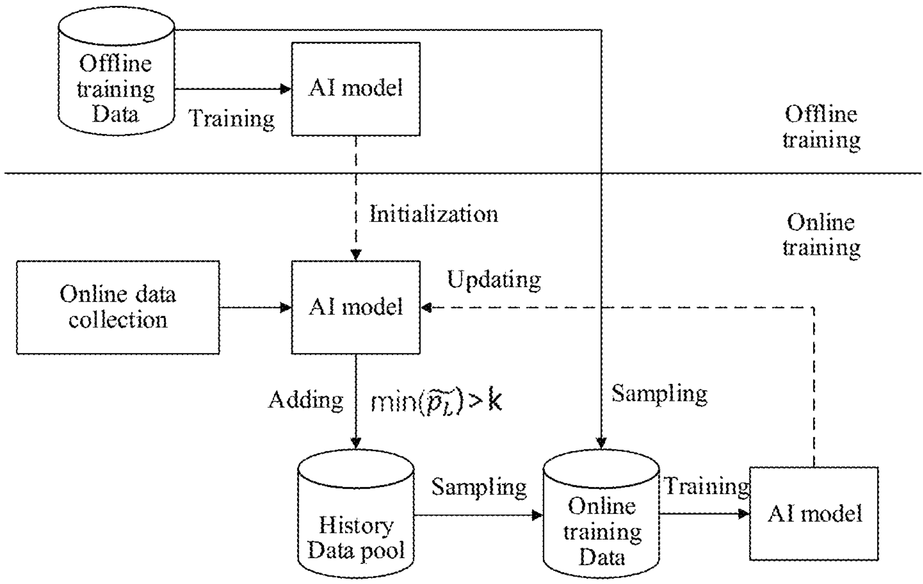
FIG. 11 schematically illustrates a schematic diagram of an action intention prediction model training framework according to an embodiment of this application.

FIG. 11 schematically illustrates a schematic diagram of an action intention prediction model training framework according to an embodiment of this application. Referring to FIG. 11, the process of training the action intention prediction model includes two stages, i.e., offline training stage and online training stage.

At the offline training stage, an Artificial Intelligence (AI) model is trained by using offline training data. The offline training data include sample electroencephalogram signals of known action intentions. In this case, the trained AI model is used as an action intention prediction model for performing action intention prediction on electroencephalogram signals. The offline training stage is equivalent to generating initialization model parameters for the action intention prediction model to be used online.

At the online training stage, an electroencephalogram signal is acquired through an online data collection process, and then the trained AI model is configured for performing inference and prediction on the electroencephalogram signal. According to the action intention prediction result of the electroencephalogram signal by the AI model, the maximum probability values $\widetilde{p_L}$ corresponding to each time node are determined. When maximum probability values respectively corresponding to the multiple time nodes are all greater than a preset probability threshold, that is, the minimum value $\min(\widetilde{p_L})$ of maximum probability values respectively corresponding to the multiple time nodes is greater than the preset probability threshold K, that is, $\min(\widetilde{p_L})>k$, the preset action corresponding to the maximum probability value corresponding to each time node is taken as an action intention label corresponding to each time node. Then, the electroencephalogram signal assigned with the action intention label is added to the historical data pool (i.e., historical data set) as the sample data for next model training. When the data volume in the historical data pool is greater than a preset quantity and a duration that the action intention prediction model has been used (i.e. the time since the last update of the model parameters of the AI model) reaches a preset duration, data are respectively sampled from the historical data pool and the offline training data, so that the difference between acquired data volumes corresponding to any two preset actions is less than or equal to a preset threshold, so as to form online training data. Finally, the AI model is trained by using the online training data to obtain updated parameters of the AI model, and the updated data are then used to update the parameters of the AI model for inference and prediction.

The technical solution in this application, by updating the model parameters online, can reduce the error caused by data offset after the continuous increase of the use duration of the model, and ensure the long-term prediction accuracy of the model.

Artificial Intelligence (AI) technology is involved in the AI model in this embodiment, AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The AI technologies generally include technologies such as a sensor, a dedicated AI chip, cloud computing, distributed storage, a big data processing technology, an operating/interaction system, and electromechanical integration. AI software technologies mainly include several major directions such as a Computer Vision (CV) technology, a speech processing technology, a natural language processing technology, and machine learning/deep learning.

With the research and progress of AI technology, AI is being studied and applied in multiple fields, such as common smart homes, smart wearables, virtual assistants, smart speakers, smart marketing, unmanned driving, autonomous driving, unmanned aerial vehicles, robots, intelligent health care, intelligent customer service, and the like.

Each operation in the method of this application is described in a specific order in the accompanying drawings, however, this does not request or imply that the operations are performed according to the specific order, or all shown operations are necessarily performed so as to implement a desired result. Additionally, or alternatively, some operations may be omitted, multiple operations may be combined into one operation for execution, and/or one operation may be decomposed into multiple operations for execution, and the like.

The following describes apparatus embodiments of this application, which may be configured for performing the method for processing an electroencephalogram signal in the above embodiment of this application.

Figure 12:
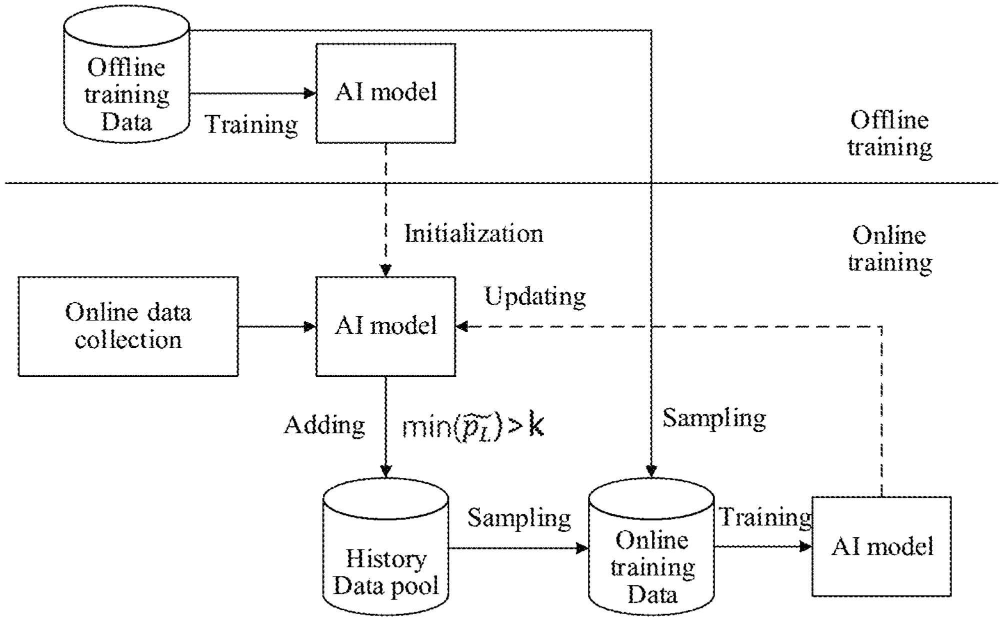
FIG. 12 schematically illustrates a structural block diagram of an apparatus for processing an electroencephalogram signal according to an embodiment of this application.

FIG. 12 schematically illustrates a structural block diagram of an apparatus for processing an electroencephalogram signal according to an embodiment of this application. Referring to FIG. 12, an apparatus 1200 for processing an electroencephalogram signal provided in this embodiment includes an online data calibration module 1210, a dense sequence prediction module 1220, a post-processing module 1230, a historical data pool 1240, and an online learning module 1250.

The input data of the online data calibration module 1210 is an electroencephalogram signal, which may be generated by motor imagery. The motor imagery electroencephalogram signal may also be referred to as motor imagery electroencephalography (EEG) signal data or motor imagery EEG sequence signal. The motor imagery EEG sequence signal is acquired through an electroencephalogram signal collection apparatus, which may be an sample electroencephalogram signal of a known action intention or may be an electroencephalogram signal.

Before the motor imagery EEG sequence signal is inputted into the online data calibration module 1210, it is also necessary to perform data extraction on the motor imagery EEG sequence signal, so that after inputting into the online data calibration module 1210, the online data calibration module 1210 determines an electroencephalogram signal data segment of a specified duration based on the electroencephalogram signal. For example, the apparatus for processing the electroencephalogram signal may request the electroencephalogram signal collection apparatus to transmit data of the most recent k seconds every s seconds. For example, data from $T_n-k$ to $T_n$ is obtained at $T_n$, where k is the specified duration.

After acquiring the input data, the online data calibration module 1210 performs preprocessing, filtering, denoising, alignment, and other operations on the input data, as shown in the preprocessing process in FIG. 7. Then, the online data calibration module 1210 transmits the data to the dense sequence prediction module 1220. The dense sequence prediction module 1220 includes an action intention prediction model. In the case that the input data is an sample electroencephalogram signal, the action intention prediction model is trained by using the sample electroencephalogram signal. In the case that the input data is an electroencephalogram signal, the action intention prediction model performs action intention prediction on the electroencephalogram signal.

Next, the post-processing module 1230 performs filtering and other post-processing operations on the action intention prediction result outputted by the dense sequence prediction module 1220 to eliminate the impact of algorithm jitter in the prediction model, and finally outputs a motor imagery sequence prediction result, which includes probabilities $P_i$ that the target action intention of the target object is preset actions.

After the motor imagery sequence prediction result is obtained, an action intention label is assigned to an electroencephalogram signal to be recognized that the maximum probability value in the prediction result is greater than or equal to a preset probability threshold. After the label is assigned, it is added to the historical data pool 1240. Moreover, the sample electroencephalogram signal processed by the online data calibration module 1210 may also be added to the historical data pool 1240.

When a model parameter update condition is met, for example, the data volume in the historical data pool 1240 is greater than a preset quantity and a duration that the action intention prediction model has been used reaches a preset duration, the data in the historical data pool 1240 are sampled to form a training data set. Then, the training data set is trained through the online learning module 1250 to obtain new model parameters, and the new model is configured for updating model parameters of the action intention prediction model in the dense sequence prediction module 1220, so as to use the action intention prediction model with updated parameters for action intention prediction in the future.

Figure 13:
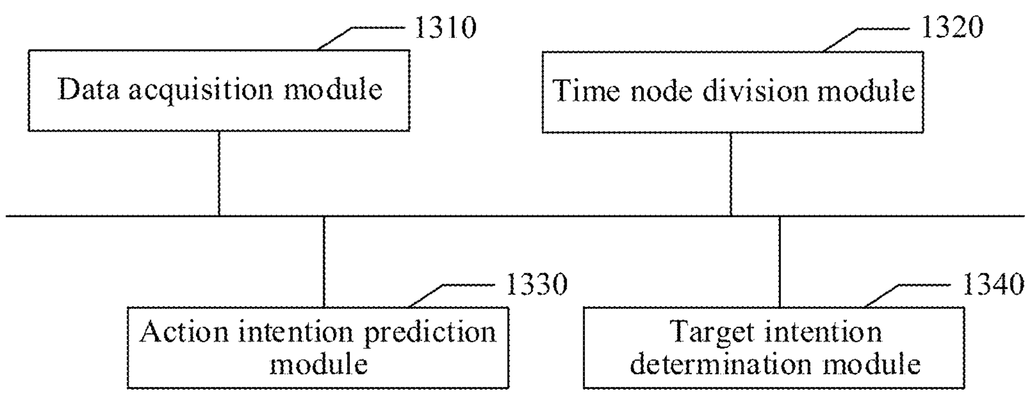
FIG. 13 schematically illustrates a structural block diagram of an apparatus for processing an electroencephalogram signal according to an embodiment of this application.

FIG. 13 schematically illustrates a structural block diagram of an apparatus for processing an electroencephalogram signal according to an embodiment of this application. Referring to FIG. 13, the apparatus for processing the electroencephalogram signal provided in this embodiment may include:

a data acquisition module 1310 configured to acquire an electroencephalogram signal, the electroencephalogram signal including an electroencephalogram signal data segment of a specified duration;

a time node division module 1320 configured to determine multiple time nodes in the electroencephalogram signal data segment according to a preset time interval;

an action intention prediction module 1330 configured to predict an action intention corresponding to each time node based on the electroencephalogram signal data segment to obtain action intention prediction results respectively corresponding to the multiple time nodes; and a target intention determination module 1340 configured to determine a target action intention according to the action intention prediction results respectively corresponding to the multiple time nodes.

In some embodiments, the action intention prediction module 1330 includes:

a feature extraction unit configured to perform feature extraction on the electroencephalogram signal data segment to obtain a first electroencephalogram feature;

a feature extraction unit configured to divide the first electroencephalogram feature into multiple first electroencephalogram feature segments according to the multiple time nodes, and perform feature extraction on the multiple first electroencephalogram feature segments to obtain a second electroencephalogram feature; and an action intention prediction unit configured to perform action intention prediction according to the second electroencephalogram feature to obtain an action intention prediction result corresponding to each time node in the electroencephalogram signal data segment.

In some embodiments, the feature extraction unit is specifically configured to:

perform feature extraction on each group of first electroencephalogram feature segments in the multiple first electroencephalogram feature segments to obtain a second electroencephalogram feature segment corresponding to each group of first electroencephalogram feature segments, where each group of first electroencephalogram feature fragments contains two adjacent first electroencephalogram feature fragments; and generate a second electroencephalogram feature according to the second electroencephalogram feature segment corresponding to each group of first electroencephalogram feature segments.

In some embodiments, the action intention prediction unit is specifically configured to:

perform action intention prediction according to the second electroencephalogram feature segment and context features of the second electroencephalogram feature segment to obtain an action intention prediction feature corresponding to a time node corresponding to the second electroencephalogram feature segment; and perform linear transformation on the action intention prediction feature corresponding to the time node corresponding to each second electroencephalogram feature segment to obtain the action intention prediction result corresponding to each time node in the electroencephalogram signal data segment.

In some embodiments, the feature extraction unit is specifically configured to:

perform convolution processing in a time dimension on the electroencephalogram signal data segment to obtain an time feature of electroencephalogram signal;

perform convolution processing in a space dimension on the time feature of electroencephalogram signal to obtain an space feature of the electroencephalogram signal;

perform normalization processing on the space feature of the electroencephalogram signal to obtain a normalization processing result, and generate an intermediate feature of the electroencephalogram signal according to the normalization processing result;

perform pooling processing on the intermediate feature of the electroencephalogram signal to obtain an pooling feature of the electroencephalogram signal; and perform logarithmic operation mapping on the pooling feature of the electroencephalogram signal to obtain the first electroencephalogram feature.

In some embodiments, the apparatus further includes:

a sample acquisition module configured to acquire an sample electroencephalogram signal of a known action intention;

a sample label generation module configured to determine multiple sample time nodes in the sample electroencephalogram signal according to the preset time interval, and generate an action intention label corresponding to each sample time node according to the known action intention;

a sample prediction module configured to perform feature extraction and mapping processing on the sample electroencephalogram signal through a prediction model to obtain an action prediction result corresponding to each sample time node in the sample electroencephalogram signal; and a first model parameter update module configured to update model parameters of the prediction model according to the action prediction result and the action intention label corresponding to each sample time node in the sample electroencephalogram signal to obtain an action intention prediction model, where the action intention prediction model is configured to perform action intention prediction on the electroencephalogram signal data segment; or the action intention prediction model is configured to perform time node division and action intention prediction on the electroencephalogram signal data segment.

In some embodiments, the action intention prediction result corresponding to each time node in the electroencephalogram signal data segment includes a probability that the action intention corresponding to each time node is a preset action; and the apparatus further includes:

a maximum probability value determination module configured to acquire a maximum probability value in the action intention prediction result corresponding to each time node;

a label determination module configured to use a preset action corresponding to the maximum probability value corresponding to each time node as an action intention label corresponding to each target time node when a minimum value of maximum probability values respectively corresponding to the multiple time nodes is greater than or equal to a preset probability threshold; and a historical data set construction module configured to add an electroencephalogram signal with the action intention label to a historical data set, where the historical data set is configured for training the action intention prediction model.

In some embodiments, the apparatus further includes:

a training data set generation module configured to acquire data corresponding to each preset action from the historical data set to generate a training data set when a data volume in the historical data set is greater than a preset quantity and a duration that the action intention prediction model has been used reaches a preset duration, where a difference between acquired data volumes corresponding to any two preset actions is less than or equal to the preset threshold; and a second model parameter update module configured to train the action intention prediction model by using the training data set to update model parameters of the action intention prediction model.

In some embodiments, the sample acquisition module is specifically configured to:

acquire an original electroencephalogram signal of a known action intention, the original electroencephalogram signal including electroencephalogram signals of multiple channels;

sequentially perform bandpass filtering, downsampling, and channel data standardization processing on the original electroencephalogram signal to obtain a first preprocessed electroencephalogram signal;

calculate a mean of the channel data corresponding to each time in the first preprocessed electroencephalogram signal, and subtract a corresponding mean of channel data from the electroencephalogram signal of each channel at each time to obtain second preprocessed electroencephalogram signals;

traverse the second preprocessed electroencephalogram signals through a sliding window of a specified duration to obtain candidate electroencephalogram signals, where a sliding step size of the sliding window is less than the specified duration; and perform alignment processing on the candidate electroencephalogram signals to obtain the sample electroencephalogram signal of the known action intention.

In some embodiments, the apparatus further includes:

a post-processing module configured to perform filtering processing on the action intention prediction result corresponding to each time node in the electroencephalogram signal data segment to obtain a filtered action intention prediction result corresponding to each time node in the electroencephalogram signal data segment;

the target intention determination module 1340 is specifically configured to:

determine a target action intention of a target object according to the filtered action intention prediction result corresponding to each time node.

In some embodiments, the target intention determination module 1340 is specifically configured to:

identify an action intention prediction result corresponding to a time node closest to a current time of the multiple time nodes as the target action intention.

In some embodiments, the action intention prediction result corresponding to each time node in the electroencephalogram signal data segment includes a probability that the action intention corresponding to each time node is a preset action; and the target intention determination module 1340 is further configured to:

use a preset action with a maximum probability in the action intention prediction result corresponding to the time node closest to the current time as the target action intention.

Specific details of the apparatus for processing the electroencephalogram signal provided in each embodiment of this application have been described in detail in the corresponding method embodiments, which will not be repeated here.

Figure 14:
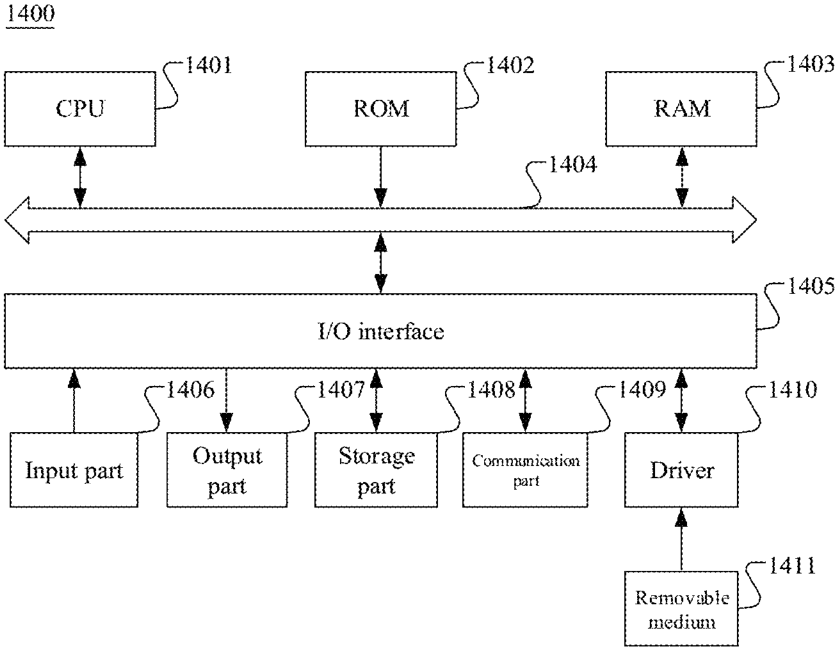
FIG. 14 schematically illustrates a structural block diagram of a computer system applicable for implementing a computer device according to an embodiment of this application.

FIG. 14 schematically illustrates a structural block diagram of a computer system applicable for implementing a computer device according to an embodiment of this application.

The computer system 1400 of the computer device shown in FIG. 14 is merely an example, and does not constitute any limitation on functions and the range of application in this embodiment.

Referring to FIG. 14, the computer system 1400 includes a central processing unit (CPU) 1401, which may execute various proper actions and processing based on a program stored in a read-only memory (ROM) 1402 or a program loaded from a storage part 1408 into a random access memory (RAM) 1403. The random access memory 1403 further stores various programs and data required by system operations. The central processing unit 1401, the read-only memory 1402, and the random access memory 1403 are connected to each other via a bus 1404. An input/output interface (namely, an I/O interface) 1405 is also connected to the bus 1404.

The following components are connected to the input/output interface 1405: an input part 1406 including a keyboard, a mouse, or the like; an output part 1407 including a Cathode Ray Tube (CRT), a Liquid Crystal Display (LCD), a speaker, or the like; the storage part 1408 including a hard disk, or the like; and a communication part 1409 including a network interface card such as a local area network card or a modem. The communication part 1409 performs communication processing by using a network such as the Internet. A driver 1410 is also connected to the input/output interface 1405 as needed. A removable medium 1411, such as a magnetic disk, an optical disc, a magneto-optical disk, or a semiconductor memory, is installed on the drive 1410 as required, so that a computer program read from the removable medium is installed into the storage part 1408 as required.

Particularly, according to an embodiment of this application, the processes described in the flowchart of each method may be implemented as a computer software program. For example, this embodiment of this application includes a computer program product, which includes computer-readable instructions carried on a computer-readable medium. The computer-readable instructions are configured for performing the method shown in any flowchart. In such an embodiment, the computer-readable instructions may be downloaded and installed from a network through the communication part 1409, and/or installed from the removable medium 1411. When the computer-readable instructions are executed by the central processing unit 1401, various functions defined in the system in this application are executed.

The computer-readable medium described in this embodiment may be a computer-readable signal medium, a computer-readable storage medium, or any combination thereof. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include, but not limited to: an electrical connection having one or more wires, a portable computer disk, a hard disk, a Random Access Memory (RAM), a Read-Only Memory (ROM), an Erasable Programmable Read-Only Memory (EPROM), a flash memory, an optical fiber, a portable Compact Disc Read-Only Memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. Moreover, in this application, the computer-readable signal medium may include a data signal propagated in a baseband or as part of a carrier, and computer-readable program code is carried thereon. A data signal propagated in such a way may assume multiple forms, including, but not limited to, an electromagnetic signal, an optical signal, or any appropriate combination thereof. The computer-readable signal medium may also be any computer-readable medium in addition to a computer-readable storage medium. The computer-readable medium may send, propagate, or transmit a program that is used by or used in combination with an instruction execution system, an apparatus, or a device. The program code included on the computer-readable medium may be transmitted by any appropriate medium, including, but not limited to: a wireless medium, a wired medium, or any suitable combination thereof.

The flowcharts and block diagrams in the accompanying drawings illustrate possible system architectures, functions and operations that may be implemented by a system, a method, and a computer program product according to various embodiments of this application. In this regard, each box in a flowchart or a block diagram may represent a module, a program segment, or a part of code. The module, the program segment, or the part of code includes one or more computer-readable instructions configured for implementing designated logic functions. In some embodiments used as substitutes, functions annotated in boxes may alternatively occur in a sequence different from that annotated in an accompanying drawing. For example, two boxes shown in succession may be performed in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and computer-readable instructions.

Although multiple modules or units of a device configured to perform actions are discussed in the foregoing detailed description, such division is not mandatory. According to the embodiments of this application, the features and functions of two or more modules or units described above may be specifically implemented in one module or unit. On the contrary, the features and functions of one module or unit described above may be further divided to be embodied by multiple modules or units.

According to the foregoing descriptions of the implementations, a person skilled in the art may readily understand that the implementations described herein may be implemented by using software, or may be implemented by combining software and necessary hardware. Therefore, the technical solutions of the embodiments of this application may be implemented in the form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. A method for processing an electroencephalogram signal executed by a computer device, comprising:

acquiring an electroencephalogram signal, the electroencephalogram signal comprising an electroencephalogram signal data segment of a specified duration;

determining a plurality of time nodes in the electroencephalogram signal data segment according to a preset time interval;

performing feature extraction on the electroencephalogram signal data segment to obtain a first electroencephalogram feature;

dividing the first electroencephalogram feature into a plurality of first electroencephalogram feature segments according to the plurality of time nodes, and performing feature extraction on the plurality of first electroencephalogram feature segments to obtain a second electroencephalogram feature;

performing action intention prediction according to the second electroencephalogram feature to obtain action intention prediction results respectively corresponding to the plurality of time nodes in the electroencephalogram signal data segment; and determining a target action intention according to the action intention prediction results.

2. The method for processing an electroencephalogram signal according to claim 1, wherein the performing feature extraction on the plurality of first electroencephalogram feature segments to obtain the second electroencephalogram feature comprises:

acquiring each group of first electroencephalogram feature segments determined based on the plurality of first electroencephalogram feature segments, each group of first electroencephalogram feature segments comprising adjacent first electroencephalogram feature segments of the plurality of first electroencephalogram feature segments;

performing feature extraction on each group of the first electroencephalogram feature segments to obtain a second electroencephalogram feature segment corresponding to each group of first electroencephalogram feature segments; and generating a second electroencephalogram feature according to the second electroencephalogram feature segment.

3. The method for processing an electroencephalogram signal according to claim 2, wherein the performing action intention prediction according to the second electroencephalogram feature to obtain action intention prediction results respectively corresponding to the plurality of time nodes in the electroencephalogram signal data segment comprises:

performing action intention prediction according to the second electroencephalogram feature segment and context features of the second electroencephalogram feature segment to obtain an action intention prediction feature corresponding to a time node corresponding to the second electroencephalogram feature segment; and performing linear transformation on the action intention prediction feature to obtain the action intention prediction result corresponding to each time node of the plurality of the time nodes in the electroencephalogram signal data segment.

4. The method for processing an electroencephalogram signal according claim 1, wherein the performing feature extraction on the electroencephalogram signal data segment to obtain the first electroencephalogram feature comprises:

performing convolution processing in a time dimension on the electroencephalogram signal data segment to obtain a time feature of the electroencephalogram signal;

performing convolution processing in a space dimension on the time feature of electroencephalogram signal to obtain a space feature of the electroencephalogram signal;

performing normalization processing on the space feature of the electroencephalogram signal to obtain a normalization processing result, and generating an intermediate feature of the electroencephalogram signal according to the normalization processing result;

performing pooling processing on the intermediate feature of the electroencephalogram signal to obtain a pooling feature of the electroencephalogram signal; and performing logarithmic operation mapping on the pooling feature of the electroencephalogram signal to obtain the first electroencephalogram feature.

5. The method for processing an electroencephalogram signal according to claim 1, further comprising:

acquiring a sample electroencephalogram signal of a known action intention;

determining a plurality of sample time nodes in the sample electroencephalogram signal according to the preset time interval, and generating an action intention label corresponding to each sample time node according to the known action intention;

performing feature extraction and mapping processing on the sample electroencephalogram signal through a prediction model to obtain an action prediction result corresponding to each sample time node in the sample electroencephalogram signal; and updating model parameters of the prediction model according to the action prediction result and the action intention label to obtain an action intention prediction model, wherein the action intention prediction model is configured to perform action intention prediction on the electroencephalogram signal data segment, or the action intention prediction model is configured to perform time node division and action intention prediction on the electroencephalogram signal data segment.

6. The method for processing an electroencephalogram signal according to claim 5, wherein the action intention prediction result corresponding to one time node of the plurality of the time nodes in the electroencephalogram signal data segment comprises a probability that the action intention corresponding to the time node is a preset action, and the method further comprises:

acquiring a maximum probability value in the action intention prediction result corresponding to the time node;

using a preset action corresponding to the maximum probability value corresponding to the time node as an action intention label corresponding to the time node when a minimum value of maximum probability values respectively corresponding to the plurality of time nodes is greater than or equal to a preset probability threshold; and adding an electroencephalogram signal with the action intention label to a historical data set, the historical data set being configured for training the action intention prediction model.

7. The method for processing an electroencephalogram signal according to claim 6, further comprising:

acquiring data corresponding to each preset action from the historical data set to generate a training data set when a data volume in the historical data set is greater than a preset quantity and a duration that the action intention prediction model has been used reaches a preset duration, wherein a difference between acquired data volumes corresponding to any two preset actions is less than or equal to the preset threshold; and training the action intention prediction model by using the training data set to update model parameters of the action intention prediction model.

8. The method for processing an electroencephalogram signal according to claim 5, wherein the acquiring the sample electroencephalogram signal of the known action intention comprises:

acquiring an original electroencephalogram signal of the known action intention, the original electroencephalogram signal comprising electroencephalogram signals of a plurality of channels;

sequentially performing bandpass filtering, downsampling, and channel data standardization processing on the original electroencephalogram signal to obtain a first preprocessed electroencephalogram signal;

calculating a mean of channel data corresponding to each instance in the first preprocessed electroencephalogram signal, and subtracting a corresponding mean of channel data from the electroencephalogram signal of each channel at each instance to obtain second preprocessed electroencephalogram signals;

traversing the second preprocessed electroencephalogram signals through a sliding window of a specified duration to obtain candidate electroencephalogram signals, wherein a sliding step size of the sliding window is less than the specified duration; and performing alignment processing on the candidate electroencephalogram signals to obtain the sample electroencephalogram signal of the known action intention.

9. The method for processing an electroencephalogram signal according to claim 1, further comprising:

performing filtering processing on the action intention prediction result corresponding to each time node of the plurality of time nodes in the electroencephalogram signal data segment to obtain a filtered action intention prediction result corresponding to the each time node in the electroencephalogram signal data segment;

the determining the target action intention according to the action intention prediction results respectively corresponding to the plurality of time nodes comprising:

determining the target action intention of a target object according to the filtered action intention prediction result corresponding to each time node.

10. The method for processing an electroencephalogram signal according to claim 1, wherein the determining the target action intention according to the action intention prediction results respectively corresponding to the plurality of time nodes comprises:

identifying an action intention prediction result corresponding to a time node closest to a current time of the plurality of time nodes as the target action intention.

11. The method for processing an electroencephalogram signal according to claim 10, wherein the action intention prediction result corresponding to one time node of the plurality of time nodes in the electroencephalogram signal data segment comprises a probability that the action intention corresponding to the time node is a preset action; and the identifying the action intention prediction result corresponding to the time node closest to the current time of the plurality of time nodes as the target action intention comprises:

identifying a preset action with a maximum probability in the action intention prediction result corresponding to the time node closest to the current time as the target action intention.

12. A computer device, comprising:

a processor; and a memory configured to store computer-readable instructions of the processor, the processor being configured to execute the computer-readable instructions to cause the computer device to perform:

acquiring an electroencephalogram signal, the electroencephalogram signal comprising an electroencephalogram signal data segment of a specified duration;

determining a plurality of time nodes in the electroencephalogram signal data segment according to a preset time interval;

performing feature extraction on the electroencephalogram signal data segment to obtain a first electroencephalogram feature;

dividing the first electroencephalogram feature into a plurality of first electroencephalogram feature segments according to the plurality of time nodes, and performing feature extraction on the plurality of first electroencephalogram feature segments to obtain a second electroencephalogram feature;

performing action intention prediction according to the second electroencephalogram feature to obtain action intention prediction results respectively corresponding to the plurality of time nodes in the electroencephalogram signal data segment; and determining a target action intention according to the action intention prediction results.

13. A non-transitory computer-readable storage medium, having computer-readable instructions stored therein, the computer-readable instructions, when executed by a processor, causing the processor to perform:

acquiring an electroencephalogram signal, the electroencephalogram signal comprising an electroencephalogram signal data segment of a specified duration;

determining a plurality of time nodes in the electroencephalogram signal data segment according to a preset time interval;

performing feature extraction on the electroencephalogram signal data segment to obtain a first electroencephalogram feature;

dividing the first electroencephalogram feature into a plurality of first electroencephalogram feature segments according to the plurality of time nodes, and performing feature extraction on the plurality of first electroencephalogram feature segments to obtain a second electroencephalogram feature;

performing action intention prediction according to the second electroencephalogram feature to obtain action intention prediction results respectively corresponding to the plurality of time nodes in the electroencephalogram signal data segment; and determining a target action intention according to the action intention prediction results.

14. The computer-readable storage medium according to claim 13, wherein the performing feature extraction on the plurality of first electroencephalogram feature segments to obtain the second electroencephalogram feature comprises:

acquiring each group of first electroencephalogram feature segments determined based on the plurality of first electroencephalogram feature segments, each group of first electroencephalogram feature segments comprising adjacent first electroencephalogram feature segments of the plurality of first electroencephalogram feature segments;

performing feature extraction on each group of the first electroencephalogram feature segments to obtain a second electroencephalogram feature segment corresponding to each group of first electroencephalogram feature segments; and generating a second electroencephalogram feature according to the second electroencephalogram feature segment.

15. The computer-readable storage medium according to claim 14, wherein the performing action intention prediction according to the second electroencephalogram feature to obtain action intention prediction results respectively corresponding to the plurality of time nodes in the electroencephalogram signal data segment comprises:

performing action intention prediction according to the second electroencephalogram feature segment and context features of the second electroencephalogram feature segment to obtain an action intention prediction feature corresponding to a time node corresponding to the second electroencephalogram feature segment; and performing linear transformation on the action intention prediction feature to obtain the action intention prediction result corresponding to each time node of the plurality of the time nodes in the electroencephalogram signal data segment.

16. The computer-readable storage medium according claim 13, wherein the performing feature extraction on the electroencephalogram signal data segment to obtain the first electroencephalogram feature comprises:

performing convolution processing in a time dimension on the electroencephalogram signal data segment to obtain a time feature of the electroencephalogram signal;

performing convolution processing in a space dimension on the time feature of electroencephalogram signal to obtain a space feature of the electroencephalogram signal;

performing normalization processing on the space feature of the electroencephalogram signal to obtain a normalization processing result, and generating an intermediate feature of the electroencephalogram signal according to the normalization processing result;

performing pooling processing on the intermediate feature of the electroencephalogram signal to obtain a pooling feature of the electroencephalogram signal; and performing logarithmic operation mapping on the pooling feature of the electroencephalogram signal to obtain the first electroencephalogram feature.

17. The computer-readable storage medium according to claim 13, wherein the computer-readable instructions further cause the processor to perform:

acquiring a sample electroencephalogram signal of a known action intention;

determining a plurality of sample time nodes in the sample electroencephalogram signal according to the preset time interval, and generating an action intention label corresponding to each sample time node according to the known action intention;

performing feature extraction and mapping processing on the sample electroencephalogram signal through a prediction model to obtain an action prediction result corresponding to each sample time node in the sample electroencephalogram signal; and updating model parameters of the prediction model according to the action prediction result and the action intention label to obtain an action intention prediction model, wherein the action intention prediction model is configured to perform action intention prediction on the electroencephalogram signal data segment, or the action intention prediction model is configured to perform time node division and action intention prediction on the electroencephalogram signal data segment.

18. The computer-readable storage medium according to claim 13, wherein the action intention prediction result corresponding to one time node of the plurality of the time nodes in the electroencephalogram signal data segment comprises a probability that the action intention corresponding to the time node is a preset action, and the computer-readable instructions further cause the processor to perform:

acquiring a maximum probability value in the action intention prediction result corresponding to the time node;

using a preset action corresponding to the maximum probability value corresponding to the time node as an action intention label corresponding to the time node when a minimum value of maximum probability values respectively corresponding to the plurality of time nodes is greater than or equal to a preset probability threshold; and adding an electroencephalogram signal with the action intention label to a historical data set, the historical data set being configured for training the action intention prediction model.

* * * * *